United States Patent
Endo et al.

(10) Patent No.: US 8,030,382 B2
(45) Date of Patent: Oct. 4, 2011

(54) POLYLACTIC ACID COMPOSITION

(75) Inventors: Kohei Endo, Iwakuni (JP); Hirotaka Suzuki, Iwakuni (JP); Takaaki Matsuda, Iwakuni (JP); Shin To, Tokyo (JP)

(73) Assignees: Teijin Limited, Osaka (JP); Musashino Chemical Laboratory, Ltd., Tokyo (JP)

( * ) Notice: Subject to any disclaimer, the term of this patent is extended or adjusted under 35 U.S.C. 154(b) by 0 days.

(21) Appl. No.: 12/528,222

(22) PCT Filed: Feb. 21, 2008

(86) PCT No.: PCT/JP2008/053456
§ 371 (c)(1),
(2), (4) Date: Dec. 4, 2009

(87) PCT Pub. No.: WO2008/102919
PCT Pub. Date: Aug. 28, 2008

(65) Prior Publication Data
US 2010/0093888 A1 Apr. 15, 2010

(30) Foreign Application Priority Data
Feb. 23, 2007 (JP) ................................ 2007-043193

(51) Int. Cl.
C08K 5/51 (2006.01)
C08K 5/52 (2006.01)
C08K 5/521 (2006.01)
C08K 5/29 (2006.01)

(52) U.S. Cl. ........ 524/141; 524/148; 524/195; 523/124; 525/415

(58) Field of Classification Search .................. 523/124; 524/195, 141, 148; 525/415
See application file for complete search history.

(56) References Cited

U.S. PATENT DOCUMENTS

| | | | |
|---|---|---|---|
| 2,941,956 A | 6/1960 | Bergstrom | |
| 5,973,024 A | 10/1999 | Imashiro et al. | |
| 6,107,378 A | 8/2000 | Imashiro et al. | |
| 6,323,307 B1 * | 11/2001 | Bigg et al. | 528/354 |
| 7,531,585 B2 * | 5/2009 | Ozawa et al. | 524/132 |
| 2004/0157967 A1 | 8/2004 | Ito | |
| 2005/0001358 A1 * | 1/2005 | Nakazawa et al. | 264/331.18 |
| 2007/0299170 A1 * | 12/2007 | Ozawa et al. | 524/132 |

FOREIGN PATENT DOCUMENTS

| | | |
|---|---|---|
| EP | 0 272 902 A2 | 6/1988 |
| EP | 1 460 107 A1 | 9/2004 |
| EP | 1 690 899 A1 | 8/2006 |
| EP | 2 067 822 A1 | 6/2009 |
| JP | 47-033279 B | 8/1972 |
| JP | 63-241024 A | 10/1988 |
| JP | 11-80522 A | 3/1999 |
| JP | 2002-030208 A | 1/2002 |
| JP | 2002-115121 A | 4/2002 |
| JP | 2003-192883 A | 7/2003 |
| JP | 2003-192884 A | 7/2003 |
| JP | 2004-224990 A | 8/2004 |
| JP | 2004-339454 A | 12/2004 |
| JP | 2005-002174 A | 1/2005 |
| JP | 2005-023260 A | 1/2005 |
| JP | 2005-232225 A | 9/2005 |
| JP | 2005-255806 A | 9/2005 |
| JP | 2007-023083 A | 2/2007 |
| JP | 2007-023393 A | 2/2007 |
| JP | 2007-191630 A | 8/2007 |

OTHER PUBLICATIONS

Hideto Tsuji, et al., "Stereocomplex Formation between Enantiomeric Poly(lactic acid)s. 3. Calorimetric Studies on Blend Films Cast from Dilute Solution", Macromolecules, 1991, pp. 5651-5656, vol. 24.
Tod W. Campbell, et al., "Carbodiimides. IV. High Polymers Containing the Carbodiimide Repeat Unit", J. Org. Chem., Aug. 1963, pp. 2069-2075, vol. 28.
Andrew Williams, et al. "Carbodiimide Chemistry: Recent Advances", 1981, pp. 619-621, vol. 81, No. 4.

* cited by examiner

*Primary Examiner* — Kriellion Sanders
(74) *Attorney, Agent, or Firm* — Sughrue Mion, PLLC

(57) ABSTRACT

It is an object of the present invention to provide a polylactic acid composition having excellent crystallinity, wet heat stability and melt stability. It is another object of the present invention to provide a molded article which is obtained from the polylactic acid composition and excellent in appearance and color. The present invention is a composition and molded article thereof which comprises a polylactic acid (component A), a carbodiimide compound (component B) and a phosphoric acid ester metal salt (component C).

13 Claims, No Drawings

POLYLACTIC ACID COMPOSITION

CROSS REFERENCE TO RELATED APPLICATIONS

This application is a National Stage of International Application No. PCT/JP2008/053456 filed Feb. 21, 2008, claiming priority based on Japanese Patent Application No. 2007-043193 filed Feb. 23, 2007, the contents of all which are incorporated herein by reference in their entirety.

TECHNICAL FIELD

The present invention relates to a composition comprising polylactic acid and having excellent wet heat stability and crystallinity and to a molded article thereof.

BACKGROUND ART

In recent years, biodegradable polymers which are decomposed in the natural environment have been attracting attention and investigated worldwide for global environmental protection. Polyhydroxy butyrate, polycaprolactone, aliphatic polyesters and polylactic acid are known as the biodegradable polymers. Since polylactic acid is obtained from lactic acid obtained from a raw material derived from living organisms and a derivative thereof, it is an environment-friendly polymer material having high bio safety. Therefore, use of polylactic acid as a general-purpose polymer is now under study, and its application to medical goods such as surgical suture threads, sustained-release capsules and reinforcement materials for broken bones as a stretched film, fiber or injection molded article is being investigated.

However, polylactic acid has a low crystallization rate and its use as a molded article obtained by crystallization is limited. For instance, it takes long to injection mold polylactic acid because its molded product must be crystallized, and a heat treatment may be required after molding.

Further, polylactic acid has low wet heat stability that it is easily decomposed by water at a high temperature.

To improve the crystallization rate of polylactic acid, a method in which a crystallization nucleating agent for promoting crystallization is added has been studied, and the crystallization rate has been improved to a certain extent. For example, it is proposed to use a phosphoric acid ester metal salt in combination with polylactic acid and it is disclosed that the salt is effective for the crystallization of the resin (patent document 1). However, when the phosphoric acid ester metal salt is used, a new problem occurs that wet heat stability becomes worse. Further, the addition of the phosphoric acid ester metal salt may greatly reduce the molecular weight.

As an alternative method, it is proposed to add an inorganic filler such as a glass fiber. However, when the inorganic filler is used, the specific gravity of the obtained molded product increases. Further, when it is burnt or scrapped, a large amount of the residue is produced, thereby impairing one of the features of environment-friendly polylactic acid. It is also proposed to add a natural organic filler such as wood powder or kenaf to polylactic acid (patent document 2). However, a cellulose-based filler has low heat stability at the molding temperature of polylactic acid by its nature and deteriorates and decomposes in a molding machine at the time of molding. Therefore, it cannot be used to manufacture a high-quality molded article stably.

As for the improvement of the wet heat stability of polylactic acid, various stabilizers such as hindered phenols are proposed but not satisfactory in the improvement of the wet heat stability of polylactic acid.

It is also proposed to improve the wet heat stability by modifying the terminal group of the molecule of polylactic acid which involves in wet heat decomposition. For example, an epoxy compound (patent document 3), carbodiimide compound (patent document 4), and oxazoline, oxazine and aziridine compounds (patent document 5) are proposed. The wet heat stability of polylactic acid is improved to a certain extent by using the above terminal group modifier. However, the terminal group modifier plasticizes a resin and deteriorates its crystallinity. The additive itself has low heat resistance, thereby deteriorating the color of the resin significantly at the time of molding and reducing its value as a commercial product.

Meanwhile, it is known that stereocomplex polylactic acid is formed by mixing together poly(L-lactic acid) and poly(D-lactic acid) in a solution or molten state (patent document 6 and non-patent document 1). This stereocomplex polylactic acid has a melting point of 200 to 230° C. which is higher than those of poly(L-lactic acid) and poly(D-lactic acid) and high crystallinity.

However, the stereocomplex polylactic acid does not show the single phase of stereocomplex polylactic acid and is a mixed-phase composition having the phases of poly(L-lactic acid) and poly(D-lactic acid) (may be referred to as "homo phase" hereinafter) and the phase of the stereocomplex polylactic acid (may be referred to as "complex phase" hereinafter). According to the DSC measurement of the stereocomplex polylactic acid, a low melting point crystal melting peak at a peak temperature of 190° C. or lower corresponding to the melting peak of a homo-phase crystal and a high melting point crystal melting peak at a peak temperature of 190° C. or higher corresponding to the melting peak of a complex-phase crystal are observed.

Since the stereocomplex polylactic acid has the complex phase and the homo phase, it has a defect that the heat resistance of the stereocomplex polylactic acid is hardly obtained fully. To obtain the heat resistance of the stereocomplex polylactic acid, the stereo crystal rate (S) defined by the following equation (a) must be not less than 80%.

$$S = [\Delta Hmsc/(\Delta Hmh + \Delta Hmsc)] \times 100 \qquad (a)$$

In the above equation (a), Hmh is the crystal melting heat of a crystal melting peak at a temperature lower than 190° C. corresponding to the melting of a homo-phase crystal observed in the DSC measurement, and ΔHmsc is the crystal melting heat of a crystal melting peak at a temperature of 190° C. or higher corresponding to the melting of a complex-phase crystal observed in the DSC measurement.

To cope with this problem, the use of a crystallization nucleating agent such as a phosphoric acid ester metal salt is proposed, and a heat-resistant composition containing no homo-phase crystal but containing only a complex-phase crystal having a crystal melting point of 209° C. and a molded article thereof are proposed (patent document 1).

Even the stereocomplex polylactic acid containing a crystallization nucleating agent such as a phosphoric acid ester metal salt does not still solve a molecular weight reduction problem which occurs in the above-described poly(L-lactic acid) and poly(D-lactic acid) and has a defect that it is difficult to retain its physical properties due to a great reduction in weight average molecular weight. The stereocomplex polylactic acid is classified into a group of aliphatic polyesters and has a defect that it is readily hydrolyzed by moisture as a feature of the aliphatic polyesters like poly(L-lactic acid) and poly(D-lactic acid). Therefore, the improvement of the wet heat resistance of the stereocomplex polylactic acid is desired.
(Patent Document 1) JP-A 2003-192884
(Patent Document 2) JP-A 2005-2174
(Patent Document 3) JP-A 2002-115121
(Patent Document 4) JP-A 11-80522
(Patent Document 5) JP-A 2002-30208
(Patent Document 6) JP-A 63-241024
(Non-patent Document 1) Macromolecules, 24, 5651 (1991)

DISCLOSURE OF THE INVENTION

It is an object of the present invention to provide a polylactic acid composition which is excellent in crystallinity, wet heat stability and melt stability. It is another object of the present invention to provide a polylactic acid composition which is excellent in moldability and mechanical strength. It is still another object of the present invention to provide a molded article which is obtained from the above polylactic acid composition and excellent in appearance and color. It is a further object of the present invention to provide stereocomplex polylactic acid which is excellent in crystallinity, wet heat stability and melt stability.

The inventors of the present invention conducted intensive studies to solve the above problems and found that a composition which is excellent in not only crystallinity but also wet heat stability is obtained by adding a carbodiimide compound (component B) and a phosphoric acid ester metal salt (component C) to a polylactic acid (component A). Further, they found that a reduction in weight average molecular weight (to be simply referred to as "molecular weight" hereinafter) which occurs when the phosphoric acid ester metal salt (component C) is used can be suppressed by the carbodiimide compound (component B), thereby making it possible to maintain high melt stability. The present invention is accomplished based on these findings.

That is, the present invention is a composition which comprises a polylactic acid (component A), a carbodiimide compound (component B) and a phosphoric acid ester metal salt (component C). The present invention is a molded article obtained from the composition. The present invention also includes a method of using the composition for the production of stereocomplex polylactic acid.

BEST MODE FOR CARRYING OUT THE INVENTION [Composition]

<Polylactic Acid: Component A>

The polylactic acid (component A) is preferably poly(L-lactic acid), poly(D-lactic acid) or stereocomplex polylactic acid.
(poly(L-lactic acid), poly(D-lactic acid))

The poly(L-lactic acid) contains preferably 90 to 100 mol %, more preferably 95 to 100 mol % of an L-lactic acid unit. Therefore, the poly(L-lactic acid) contains preferably 0 to 10 mol %, more preferably 0 to 5 mol % of a unit except for the L-lactic acid unit.

The poly(D-lactic acid) contains preferably 90 to 100 mol %, more preferably 95 to 100 mol % of a D-lactic acid unit. Therefore, the poly(D-lactic acid) contains preferably 0 to 10 mol %, more preferably 0 to 5 mol % of a unit except for the D-lactic acid unit.

Examples of the constituent component except for lactic acid include dihydric alcohols such as ethylene glycol, propylene glycol, propanediol, butanediol, heptanediol, hexanediol, octanediol, nonanediol, decanediol, 1,4-cyclohexane dimethanol, neopentyl glycol, diethylene glycol, triethylene glycol, polyethylene glycol and polytetramethylene glycol. Alcohols having 3 or more hydroxyl groups such as glycerin, trimethylol propane and pentaerithritol are also included in the above examples. Aromatic hydroxyl compounds such as hydroquinone, resorcinol and bisphenol A are further included. Dicarboxylic acids such as oxalic acid, succinic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, bis(4-carboxyphenyl)methane, anthracenedicarboxylic acid, bis(4-carboxyphenyl)ether and sodium 5-sulfoisophthalate are still further included. Polycarboxylic acids having 3 or more carboxyl groups such as trimellitic acid and pyromellitic acid are still further included. Oxyacids such as glycolic acid, hydroxypropionic acid, hydroxybutyric acid, hydroxyvaleric acid, hydroxycaproic acid and hydroxybenzoic acid are still further included. Lactones such as caprolactone, valerolactone, propiolactone, undecalactone and 1,5-oxepan-2-one are still further included.

The component except for lactic acid may be copolymerized in limits that do not impair the biodegradability of polylactic acid to attain a desired purpose. The upper limit of the weight ratio of the component should be 30 mol %, and the range of the weight ratio is preferably 0 to 10 mol %, more preferably 0 to 5 mol % of the total of all the constituent components.

In the present invention, it is preferred that poly(L-lactic acid) and poly(D-lactic acid) should have the high optical purity of the lactic acid component in order not to impair the crystallinity and heat resistance of the composition. That is, the content of the L-form in poly(L-lactic acid) and the content of the D-form in poly(D-lactic acid) are each preferably not less than 90 mol %, more preferably not less than 95 mol %, much more preferably not less than 97 mol %, particularly preferably not less than 98 mol %. The upper limit of the content of the D-form or the L-form is 100 mol %.

The melting point of poly(D-lactic acid) or poly(L-lactic acid) constituting the component A depends on the optical purity of the lactic acid component. When the L-form or the D-form is contained in an amount of not less than 95 mol %, the melting point is 150° C. or higher. The melting point of the component A is preferably 120° C. or higher, more preferably 130° C. or higher, much more preferably 150° C. or higher.
(Stereocomplex Polylactic Acid)

The component A may be stereocomplex polylactic acid. The stereocomplex polylactic acid is polylactic acid obtained by mixing together poly(L-lactic acid) and poly(D-lactic acid) in a solution or molten state.

In the stereocomplex polylactic acid, the weight ratio of poly(L-lactic acid) to poly(D-lactic acid) is preferably 90/10 to 10/90, more preferably 80/20 to 20/80, much more preferably 30/70 to 70/30, particularly preferably 40/60 to 60/40. It is theoretically ideal that the weight ratio should be as close to 1/1 as possible.

When a composition comprising poly(L-lactic acid) and poly(D-lactic acid) in the above weight ratio is used, the formation of the stereocomplex polylactic acid proceeds well and the stereo crystal rate (S) can be increased to 80% or more. To obtain the inherent heat resistance of the stereocomplex polylactic acid, the stereo crystal rate is preferably 80 to 100%, more preferably 90 to 100%, much more preferably 95 to 100%. It is particularly preferably 100%.
(Physical Properties of Component A)

The weight average molecular weight (Mw) of the polylactic acid (component A) is selected in consideration of the relationship between molding ease and the mechanical and thermal properties of the obtained molded article. That is, in order to obtain a composition having excellent mechanical and thermal properties such as strength, elongation and heat resistance, the weight average molecular weight is preferably not less than 80,000, more preferably not less than 100,000, much more preferably not less than 130,000.

As the melt viscosity of a polylactic acid having a high molecular weight rises at an exponential rate, when melt molding such as injection molding is carried out, the molding temperature must be set high in order to control the viscosity of the polylactic acid to a range at which molding is possible. However, the polylactic acid cannot withstand a high molding temperature, which is one of the features of aliphatic polyesters. That is, when molding is carried out at a temperature higher than 300° C., it is very likely that the obtained molded article is colored due to the thermal decomposition of the polylactic acid with the result that it has a low value as a commercial product. If molding can be repeated several times without coloring, when mass-production is carried out, polylactic acid remaining in a molding machine is gradually decomposed, thereby increasing the potential of coloring a product as molding is continued.

When the molding temperature of the composition exceeds 300° C., it is difficult to carry out molding stably without causing the coloration of a product. To mold the composition at a temperature lower than 300° C., the weight average molecular weight (Mw) of the polylactic acid (component A) is preferably not more than 500,000, more preferably not more than 400,000, much more preferably not more than 300,000. Therefore, the weight average molecular weight (Mw) of the polylactic acid (component A) is preferably 80,000 to 500,000, more preferably 100,000 to 400,000, much more preferably 130,000 to 300,000.

The ratio of the weight average molecular weight (Mw) to the number average molecular weight (Mn) of the polylactic acid (component A) is called "molecular weight dispersion" (Mw/Mn). A large molecular weight dispersion means that the proportions of large molecules and small molecules are large as compared with average molecular weight.

That is, when a polylactic acid having a large molecular weight dispersion, for example, a resin having a relatively high weight average molecular weight of about 250,000 is used, the proportion of molecules having a weight average molecular weight of more than 250,000 may be large. In this case, the melt viscosity becomes high, which is not preferred from the viewpoint of molding in the above sense. When a polylactic acid having a relatively low weight average molecular weight of about 80,000 is used, the proportion of molecules having a weight average molecular weight of less than 80,000 may be large. In this case, the durability which is one of the mechanical properties of a molded article becomes low, which is not preferred for its practical use. From this point of view, the molecular weight dispersion is preferably 1.5 to 2.4, more preferably 1.6 to 2.4, much more preferably 1.6 to 2.3.

The polylactic acid (component A) preferably has a lactide content of 0 to 5,000 (ppm). A polylactic acid (component A) obtained by melt ring-opening polymerization generally contains not less than 1 wt % of lactide, and polylactide contained in the polylactic acid deteriorates the resin at the time of melt processing and worsens its color, thereby making it impossible to use the obtained molded product as a commercial product.

The content of lactide in the polylactic acid (component A) can be reduced by vacuum volatilization in a single-screw or multi-screw extruder or high vacuum treatment in a polymerizer. As the content of lactide is smaller, the stability of the resin improves. However, it is economical to set the content according to a desired purpose. Therefore, it is rational to set it to 0 to 1,000 (ppm) at which practical stability is obtained. It is more preferably 0 to 700 (ppm), particularly preferably 0 to 500 (ppm).

(Production of poly(D-lactic acid) or poly(L-lactic acid))

Poly(D-lactic acid) or poly(L-lactic acid) constituting the component A can be produced by direct melt polymerization, solid-phase polymerization or the melt ring-opening polymerization of lactide. Out of these, the melt ring-opening polymerization of lactide is preferred from the economical point of view. To produce poly(D-lactic acid) or poly(L-lactic acid) by melt ring-opening polymerization, L-lactide or D-lactide for obtaining the L-form or D-form of lactic acid is used.

The component A obtained by melt ring-opening polymerization is preferably poly(D-lactic acid) or poly(L-lactic acid) obtained by melt ring-opening polymerizing D-lactide or L-lactide having an optical purity of 90 to 100% in the presence of an alcohol-based initiator and a metal catalyst and adding a catalyst deactivator in an amount of 0.3 to 20 equivalents based on 1 equivalent of the metal element of the metal catalyst.

A description is subsequently given of the metal catalyst, catalyst deactivator and alcohol-based initiator.

Examples of the metal catalyst include alkali metals, alkali earth metals, rare and transition metals, and fatty acid salts, carbonates, sulfates, phosphates, oxides, hydroxides, halides and alcoholates of aluminum, germanium, tin, antimony and titanium. Out of these, the metal catalyst is preferably a fatty acid salt, carbonate, sulfate, phosphate, oxide, hydroxide, halide or alcoholate of at least one metal selected from tin, aluminum, zinc, calcium, titanium, germanium, manganese, magnesium and rare earth elements.

Tin-containing compounds include stannous chloride, stannous bromide, stannous iodide, stannous sulfate, stannic oxide, tin myristate, tin octylate, tin stearate, tetraphenyltin, tin methoxide, tin ethoxide and tin butoxide. Aluminum-containing compounds include aluminum oxide, aluminum acetylacetonate, aluminum isopropoxide and aluminum-imine complex.

Titanium-containing compounds include titanium tetrachloride, ethyl titanate, butyl titanate, glycol titanate and titanium tetrabutoxide. Zinc chloride, zinc oxide, diethylzinc, antimony trioxide, antimony tribromide, antimony acetate, calcium oxide, germanium oxide, manganese oxide, manganese carbonate, manganese acetate, magnesium oxide and yttrium alkoxide are also enumerated as examples of the metal catalyst.

Out of these, tin-containing compounds such as stannous chloride, stannous bromide, stannous iodide, stannous sulfate, stannic oxide, tin myristate, tin octylate, tin stearate and tetraphenyltin, and aluminum-containing compounds such as aluminum acetylacetonate, aluminum butoxide and aluminum-imine complex are preferred from the viewpoints of catalytic activity and little side-reaction. Diethoxytin, dinonyloxytin, tin myristate, tin octylate, tin stearate, tin chloride, aluminum acetylacetonate and aluminum isopropoxide are more preferred.

The amount of the catalyst is $0.42 \times 10^{-4}$ to $100 \times 10^{-4}$ (mole) based on 1 kg of lactide, or $1.68 \times 10^{-4}$ to $42.1 \times 10^{-4}$ (mole) when reactivity, the color and stability of the obtained polylactic acid are taken into consideration, particularly preferably $2.53 \times 10^{-4}$ to $16.8 \times 10^{-4}$ (mole).

The following compounds are enumerated as examples of the deactivator used to deactivate the catalyst for polylactic acid obtained by melt ring-opening polymerization in the presence of the metal catalyst. That is, they are an imine compound, phosphorus oxoacid, phosphorus oxoacid ester and organic phosphorus oxoacid compound represented by the following formula (1).

$$X^1—P(=O)_m(OH)_n(OX^2)_{2-n} \qquad (1)$$

In the formula (1), m is 0 or 1, n is 1 or 2, and $X^1$ and $X^2$ are each independently a hydrocarbon group which may have a substituent and has 1 to 20 carbon atoms.

The amount of the deactivator is preferably 0.4 to 15 equivalents, particularly preferably 0.5 to 10 equivalents based on 1 equivalent of the metal element.

The imine compound is a phenol quadridentate chelate ligand which has an imono group in the structure and can be coordinated to the metal catalyst. Since the imine compound is not Brensted acid or base unlike the conventional catalyst deactivator, it can improve heat stability without deteriorating the hydrolysis resistance of the polylactic acid.

Examples of the imine compound include N,N'-bis(salicylidene)ethylenediamine, N,N'-bis(salicylidene)propanediamine, N,N'-bis(salicylidene)-cis-cyclohexanediamine, N,N'-bis(salicylidene)-trans-cyclohexanediamine, N,N'-bis(salicylidene)-o-phenylenediamine, N,N'-bis(salicylidene)-m-phenylenediamine, N,N'-bis(salicylidene)-p-phenylenediamine, N,N'-bis(2-cyanobenzylidene)ethylenediamine, N,N'-bis(2-cyanobenzylidene)propanediamine, N,N'-bis(2-cyanobenzylidene)-cis-cyclohexanediamine, N,N'-bis(2-cyanobenzylidene)-trans-cyclohexanediamine, N,N'-bis(2-cyanobenzylidene)-o-phenylenediamine, N,N'-bis(2-cyanobenzylidene)-m-phenylenediamine, N,N'-bis(2-cyanobenzylidene)-p-phenylenediamine, N-methyliminomethyl phenol, N-ethyliminomethyl phenol, N-isopropyliminomethyl phenol and N-t-butyliminomethyl phenol. Out of these, N,N'-bis(salicylidene) ethylenediamine and N,N'-bis(salicylidene) propanediamine are particularly preferred.

Examples of the phosphorus oxoacid include low oxidation number phosphoric acids having an acid number of 5 or less, such as dihydride oxophosphoric (I) acid, dihydride tetraoxodiphosphoric (II,II) acid, hydride trioxophosphoric (III) acid, dihydride pentaoxodiphosphoric (III) acid, hydride pentaoxodiphosphoric (II, IV) acid, dodecaoxohexaphosphoric (III) acid, hydride octaoxotriphosphoric (III, IV, IV) acid, octaoxotriphosphoric (IV, III, IV) acid, hydride hexaoxodiphosphoric (III, V) acid, hexaoxodiphosphoric (IV) acid, decaoxotetraphosphoric (IV) acid, hendecaoxotetraphosphoric (VI) acid and enneaoxotriphosphoric (V, IV, IV) acid.

Orthophosphoric acids represented by the formula $xH_2O.yP_2O_5$ and satisfying $x/y=3$, polyphosphoric acids called "diphosphoric acid, triphosphoric acid, tetraphosphoric acid and pentaphosphoric acid" according to the degree of condensation and satisfying $2>x/y>1$ and mixtures thereof, and metaphosphoric acids satisfying $x/y=1$ are also included in the above examples. Out of these, trimetaphosphoric acid, tetrametaphosphoric acid and ultraphosphoric acids having a net-like structure with part of the phosphorus pentaoxide structure and satisfying $1>x/y>0$ are enumerated as examples of the deactivator. Partial and whole esters of the above acid and a monohydric alcohol, polyhydric alcohol or polyalkylene glycol are also enumerated as examples. Acids or acidic esters are preferably used from the viewpoint of catalyst deactivating capability.

The alcohol forming an ester of phosphorus oxoacid is not particularly limited but an alcohol represented by the following formula (4) is preferably used as a monohydric alcohol.

$$Y—OH \qquad (4)$$

In the formula (4), Y is a hydrocarbon group which may have a substituent and has 1 to 22 carbon atoms. Y is preferably an alkyl group having 1 to 16 carbon atoms, cyclohexyl group having 6 to 16 carbon atoms or aryl group having 6 to 16 carbon atoms. Examples of the monohydric alcohol include methyl alcohol, ethyl alcohol, propyl alcohol, butyl alcohol, 2-ethylhexyl alcohol, decanol, dodecanol, benzyl alcohol, cyclohexyl alcohol, hexyl alcohol, phenol and hexadecyl alcohol.

The polyhydric alcohol is a polyhydric alcohol represented by the following formula (5) which may have a substituent and has 2 to 22 carbon atoms, or a sugar alcohol.

$$X(—OH)_a \qquad (5)$$

In the above formula, X is a hydrocarbon group which may have a substituent and has 2 to 22 carbon atoms. "a" is an integer of 2 to 6. X is preferably a group obtained by removing the number of hydrocarbon atoms corresponding to "a" from an alkane having 2 to 22 carbon atoms. Examples of the polyhydric alcohol include ethylene glycol, 1,3-propanediol, 1,4-butanediol, 1,6-hexanediol, glycerin, pentaerythritol, trimethylolpropane, polyethylene glycol, polypropylene glycol, inositols such as myo-inositol, D- and L-inositols, scyllo-inositol, and cyclitol.

Examples of the deactivator include phosphoric acid, phosphorous acid, hypophosphorous acid, pyrophosphoric acid, trimetaphosphoric acid, tetrametaphosphoric acid, phenyl phosphonic acid, benzyl phosphinic acid, dibutyl phosphate, dinonyl phosphate, N'-bis(salicylidene) ethylenediamine and N,N'-bis(salicylidene) propanediamine. Out of these, phosphoric acid, phosphorous acid and pyrophosphoric acid are particularly preferred. These deactivators may be used alone or in combination of two or more.

The alcohol-based initiator is selected from aliphatic monohydric alcohol represented by the following formula (6), polyhydric alcohol represented by the following formula (7) and polyalkylene glycol represented by the following formula (8).

$$A—OH \qquad (6)$$

In the formula (6), A is an aliphatic hydrocarbon group which may have a substituent and has 1 to 20 carbon atoms. A is preferably an alkyl group having 1 to 16 carbon atoms.

$$B—(OH)_b \qquad (7)$$

In the formula (7), B is a b-valent hydrocarbon group having 2 to 20 carbon atoms, and "b" is an integer of 2 to 5. B is preferably a group obtained by removing the number of hydrocarbon atoms corresponding to "b" from an alkane having 2 to 22 carbon atoms.

$$HO—(C—O)_c—H \qquad (8)$$

In the formula (8), C is an alkylene group having 2 to 5 carbon atoms, and "c" is an integer of 2 to 100.

Examples of the monohydric alcohol include methanol, ethanol, n-propyl alcohol, n-butyl alcohol, sec-butyl alcohol, pentyl alcohol, n-hexyl alcohol, cyclohexyl alcohol, octyl alcohol, nonyl alcohol, 2-ethylhexyl alcohol, n-decyl alcohol, n-dodecyl alcohol, hexadecyl alcohol, lauryl alcohol, ethyl lactate and hexyl lactate.

Examples of the polyhydric alcohol include ethylene glycol, propylene glycol, propanediol, butanediol, pentanediol, hexanediol, octanediol, glycerin, sorbitan, neopentyl glycol, trimethylolpropane and pentaerythritol.

Examples of the polyalkylene glycol include diethylene glycol, triethylene glycol, polyethylene glycol, polypropylene glycol, adducts of ethylene oxide with phenols and adducts of ethylene glycol with bisphenols.

Stearyl alcohol, lauryl alcohol, ethylene glycol, propanediol, butanediol, hexanediol, polyethylene glycol and polypropylene glycol are preferred from the viewpoints of reactivity and the physical properties of polylactide.

The amount of the alcohol initiator is nonequivocally determined in consideration of a desired weight average molecular weight (Mw). For instance, to produce a polylactic acid having an Mw of 70,000 to 110,000, 0.009 to 0.03 (mole), particularly preferably 0.014 to 0.021 (mole) of a monohydric alcohol is used based on 1 kg of lactide. To produce a polylactic acid having an Mw of 100,000 to 200,000, 0.009 to 0.02 (mole), particularly preferably 0.01 to 0.018 (mole) of a monohydric alcohol is used based on 1 kg of lactide.

A mixture of the lactide, catalyst and alcohol-based initiator is polymerized at a temperature range of 180 to 230° C., preferably 185 to 220° C. for 2 to 10 hours in a continuous or batch process by using a vertical polymerizer, horizontal polymerizer, tubular polymerizer or a combination of these while reaction heat is removed in accordance with a conventionally known method. The reaction time and the reaction temperature must be suitably selected by checking the proceeding of polymerization.

(Production of Stereocomplex Polylactic Acid)

The stereocomplex polylactic acid can be produced by mixing together poly(L-lactic acid) and poly(D-lactic acid) in a solution or molten state.

<Carbodiimide Compound: Component B>

The component B used in the present invention is a compound having at least one carbodiimide group in the molecule. The component B preferably contains a small amount of an isocyanate group in the molecule. When it contains a small amount of the isocyanate group, the wet heat stability of the composition can be improved. That is, when the isocyanate group is existent in the component B, an effect obtained by using an isocyanate compound appears and also the wet heat stability is further improved due to the fact that the carbodiimide group and the isocyanate group are existent close to each other.

When a polycarbodiimide compound is used, it is preferred that a plurality of carbodiimide groups existent in the molecule should be spaced out a suitable distance apart. That is, the carbodiimide equivalent is preferably about 200 to 500. The component B is preferably a compound which contains 0.1 to 5 wt % of an isocyanate group and has a carbodiimide equivalent of 200 to 500.

Examples of the carbodiimide compound include mono- and di-carbodiimide compounds such as dicyclohexyl carbodiimide, diisopropyl carbodiimide, dimethyl carbodiimide, diisobutyl carbodiimide, dioctyl carbodiimide, octyldecyl carbodiimide, di-t-butyl carbodiimide, t-butylisopropyl carbodiimide, dibenzyl carbodiimide, diphenyl carbodiimide, N-octadecyl-N'-phenylcarbodiimide, N-benzyl-N'-phenylcarbodiimide, N-benzyl-N'-tolylcarbodiimide, di-o-toluoylcarbodiimide, di-p-toluoylcarbodiimide, bis(p-nitrophenyl) carbodiimide, bis(p-aminophenyl)carbodiimide, bis(p-hydroxyphenyl)carbodiimide, bis(p-chlorophenyl) carbodiimide, bis(o-chlorophenyl)carbodiimide, bis(o-ethylphenyl)carbodiimide, bis(p-ethylphenyl)carbodiimide, bis(o-isopropylphenyl)carbodiimide, bis(p-isopropylphenyl) carbodiimide, bis(o-isobutylphenyl)carbodiimide, bis(p-isobutylphenyl)carbodiimide, bis(2,5-dichlorophenyl)carbodiimide, p-phenylenebis(o-toluoylcarbodiimide), p-phenylenebis(cyclohexylcarbodiimide), p-phenylenebis (p-chlorophenylcarbodiimide), 2,6,2',6'-tetraisopropyldiphenyl carbodiimide, hexamethylenebis(cyclohexylcarbodiimide), ethylenebis(phenylcarbodiimide), ethylenebis (cyclohexylcarbodiimide), bis(2,6-dimethylphenyl) carbodiimide, bis(2,6-diethylphenyl)carbodiimide, bis(2-ethyl-6-isopropylphenyl)carbodiimide, bis(2-butyl-6-isopropylphenyl)carbodiimide, bis(2,6-diisopropylphenyl) carbodiimide, bis(2,6-di-t-butylphenyl)carbodiimide, bis(2,4,6-trimethylphenyl)carbodiimide, bis(2,4,6-triisopropylphenyl)carbodiimide, bis(2,4,6-tributylphenyl) carbodiimide, di-β-naphthylcarbodiimide, N-tolyl-N'-cyclohexylcarbodiimide and N-tolyl-N'-phenylcarbodiimide.

Out of these, bis(2,6-diisopropylphenyl)carbodiimide and 2,6,2',6'-tetraisopropyldiphenylcarbodiimide are preferred from the viewpoints of reactivity and stability. Use of dicyclohexyl carbodiimide or diisopropyl carbodiimide which can be industrially acquired is also preferred.

Polycarbodiimides such as poly(1,6-cyclohexanecarbodiimide), poly(4,4'-methylenebiscyclohexylcarbodiimide), poly(1,3-cyclohexylenecarbodiimide), poly(1,4-cyclohexylenecarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(p-tolylcarbodiimide), poly(diisopropylcarbodiimide), poly(methyldiisopropylphenylenecarbodiimide) and poly (triethylphenylenecarbodiimide) may also be used. Commercially available polycarbodiimide compounds include Carbodilite LA-1 and HMV-8CA (as a tradename of "Carbodilite") marketed from Nisshinbo Industries, Inc.

The component B can be produced by conventionally known methods. For example, it can be produced by subjecting an organic isocyanate to a decarbonation condensation reaction without a solvent or in an inactive solvent at a temperature of 70° C. or higher in the presence of an organic phosphorus compound or organic metal compound as a catalyst. The polycarbodiimide compound can be produced by conventionally known methods for producing a polycarbodiimide compound, disclosed, for example, in U.S. Pat. No. 2,941,956, JP-B 47-33279, J. Org. Chem. 28, 2069-2075 (1963), and Chemical Review 1981, Vol. 81, No. 4, p. 619-621.

An organic diisocyanate which is preferably used as a raw material for the production of a carbodiimide is an aromatic, aliphatic or alicyclic diisocyanate or a mixture thereof. Specific examples of the organic diisocyanate include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-4,4'-diisocyanate, xylylene diisocyanate, isophorone diisocyanate, dicyclohexylmethane-4, 4'-diisocyanate, methylcyclohexane diisocyanate, tetramethylxylylene diisocyanate and 2,6-diisopropylphenyl-1,4-diisocyanate.

When a monoisocyanate compound is used to produce a polycarbodiimide, the degree of polymerization can be controlled by reacting it with the terminal isocyanate of a polycarbodiimide compound. Examples of the monoisocyanate compound include phenyl isocyanate, tolyl isocyanate, dimethylphenyl isocyanate, cyclohexyl isocyanate, butyl isocyanate and naphthyl isocyanate.

A terminal capping agent for capping the terminal of a polycarbodiimide compound to control the degree of polymerization is not limited to the above monoisocyanates. The terminal capping agent is an active hydrogen compound which can react with an isocyanate group, such as aliphatic, aromatic or alicyclic compound, in which a compound may have OH group, =NH, —NH$_2$, —COOH, or —SH group or epoxy group in the molecule. Examples of the terminal capping agent include methanol, ethanol, phenol, cyclohexanol, N-methylethanolamine, polyethylene glycol monomethyl ether, polypropylene glycol monomethyl ether, diethylamine, dicyclohexylamine, butylamine, cyclohexylamine, butyric acid, benzoic acid, cyclohexane acid, ethyl mercaptan, allyl mercaptan and thiophenol.

The carbodiimide production reaction is the decarbonation condensation reaction of an organic isocyanate in the presence of a carbodiimidation catalyst. The carbodiimidation catalyst is a conventionally known catalyst such as an organic phosphorus-based compound or organic metal compound.

The organic phosphorus-based compound is preferably a phosphorene oxide from the viewpoint of catalytic activity. Examples of the organic phosphorus-based compound include 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide and double bond isomers thereof. Out of these, 3-methyl-1-phenyl-2-phosphorene-1-oxide which is easily acquired industrially is particularly preferred.

The organic metal compound is, for example, a compound represented by the following formula (9).

$$D\text{-}(OE)_d \qquad (9)$$

In the formula (9), D is sodium, potassium, calcium, barium, titanium, vanadium, tungsten, hafnium, zirconium, lead, manganese or nickel. E is an alkyl group having 1 to 20 carbon atoms, cycloalkyl group having 6 to 20 carbon atoms or aryl group. "d" is the valence of the metal element D.

The content of the component B is preferably 0.01 to 10 parts by weight, more preferably 0.1 to 5.0 parts by weight, much more preferably 0.5 to 2.0 parts by weight based on 100 parts by weight of the component A.

<Phosphoric Acid Ester Metal Salt: Component C>

The phosphoric acid ester metal salt (component C) used in the present invention is preferably selected from compounds represented by the following formulas (2) and (3). These components C may be used alone or in combination of two or more.

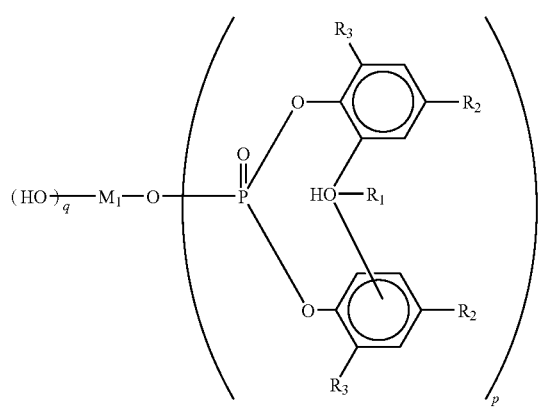

(2)

In the formula (2), R$_1$ is a hydrogen atom or alkyl group having 1 to 4 carbon atoms. Examples of the alkyl group having 1 to 4 carbon atoms represented by R$_1$ include methyl, ethyl, n-propyl, iso-propyl, n-butyl, sec-butyl and iso-butyl.

R$_2$ and R$_3$ are each independently a hydrogen atom or alkyl group having 1 to 12 carbon atoms. Examples of the alkyl group having 1 to 12 carbon atoms include methyl, ethyl, n-propyl, iso-propyl, n-butyl, sec-butyl, iso-butyl, tert-butyl, pentyl, tert-pentyl, hexyl, heptyl, octyl, iso-octyl, tert-octyl, 2-ethylhexyl, nonyl, iso-nonyl, decyl, iso-decyl, tert-decyl, undecyl, dodecyl and tert-dodecyl.

M$_1$ is an alkali metal atom, alkali earth metal atom, zinc atom or aluminum atom. Examples of the alkali metal atom include Na, K and Li. Examples of the alkali earth metal atom include Mg and Ca. "p" is 1 or 2. "q" is 0 when M$_1$ is an alkali metal atom, alkali earth metal atom or zinc atom and 1 or 2 when M$_1$ is an aluminum atom.

Out of the phosphoric acid ester metal salts represented by the formula (2), phosphoric acid ester metal salts of the formula (2) in which R$_1$ is a hydrogen atom and R$_2$ and R$_3$ are both tert-butyl groups are preferred.

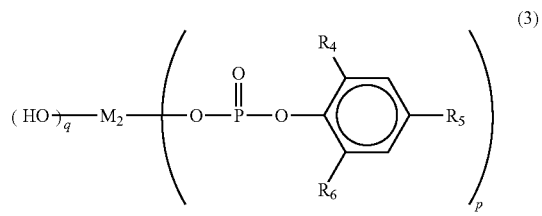

(3)

In the formula (3), R$_4$, R$_5$ and R$_6$ are each independently a hydrogen atom or alkyl group having 1 to 12 carbon atoms. Examples of the alkyl group having 1 to 12 carbon atoms represented by R$_4$, R$_5$ and R$_6$ include methyl, ethyl, n-propyl, iso-propyl, n-butyl, sec-butyl, iso-butyl, tert-butyl, pentyl, tert-pentyl, hexyl, heptyl, octyl, iso-octyl, tert-octyl, 2-ethylhexyl, nonyl, iso-nonyl, decyl, iso-decyl, tert-decyl, undecyl, dodecyl and tert-dodecyl.

M$_2$ is an alkali metal atom, alkali earth metal atom, zinc atom or aluminum atom. Examples of the alkali metal atom include Na, K and Li. Examples of the alkali earth metal atom include Mg and Ca. "p" is 1 or 2. "q" is 0 when M$_2$ is an alkali metal atom, alkali earth metal atom or zinc atom and 1 or 2 when M$_2$ is an aluminum atom.

Out of the phosphoric acid ester metal salts represented by the formula (3), phosphoric acid ester metal salts of the formula (3) in which R$_4$ and R$_6$ are methyl groups and R$_5$ is a tert-butyl group are preferred. The Adecastab NA-10, NA-11, NA-21, NA-30 and NA-35 (trade name) of Asahi Denka Kogyo K.K. may also be used as the phosphoric acid ester metal salts (component C). The phosphoric acid ester metal salt (component C) can be synthesized by a known method.

The content of the component C is preferably 0.01 to 5 parts by weight, more preferably 0.05 to 4 parts by weight, much more preferably 0.1 to 3 parts by weight based on 100 parts by weight of the component A. When the content is lower than 0.01 part by weight, the desired effect of improving crystallinity is rarely observed or not satisfactory for practical use. When the content is higher than 5 parts by weight, the component C may cause the thermal decomposition of the composition at the time of molding or may deteriorate the wet heat stability of the obtained molded article. The composition of the present invention preferably comprises 0.01 to 10 parts by weight of the component B and 0.01 to 5 parts by weight of the component C based on 100 parts by weight of the component A.

The composition of the present invention may further comprise at least one selected from the group consisting of a thermoplastic resin (component D) except for the component A, stabilizer (component E), crystallization accelerator (component F), filler (component G), release agent (component H), antistatic agent (component I), carboxyl group reactive terminal capping agent (component J), plasticizer (component K) and impact resistance stabilizer (component L).

<Thermoplastic Resin: Component D>

The composition of the present invention may comprise a thermoplastic resin (component D) except for polylactic acid. The thermoplastic resin is a polyolefin-based resin such as polyester resin except for polylactic acid, polyamide resin, polyacetal resin, polyethylene resin or polypropylene resin. Other examples of the thermoplastic resin include polystyrene resin, acrylic resin, polyurethane resin, chlorinated polyethylene resin, chlorinated polypropylene resin, aromatic and aliphatic polyketone resins, fluororesin, polyphenylene sulfide resin, polyether ketone resin, polyimide resin, thermoplastic starch resin, AS resin, ABS resin, AES resin, ACS resin, polyvinyl chloride-based resin, polyvinylidene chloride resin, vinyl ester-based resin, MS resin, polycarbonate resin, polyarylate resin, polysulfone resin, polyether sulfone resin, phenoxy resin, polyphenylene oxide resin, poly-4-methylpentene-1, polyether imide resin, cellulose acetate resin and polyvinyl alcohol resin. Out of these, the composition preferably comprises at least one selected from polyacetal resin, polyester resin except for polylactic acid such as PET, PPT, BPT and PEN, and polyamide resin.

The polyacetal resin is, for example, a so-called "polyacetal homopolymer" having an oxymethylene unit as the main recurring unit and obtained from formaldehyde or trioxane. The polyacetal resin also includes a so-called "polyacetal copolymer" having an oxymethylene unit as the main recurring unit and containing not more than 15 mol % of an oxyalkylene unit having 2 to 8 adjacent carbon atoms in the main chain. The polyacetal resin may be a copolymer containing another constituent unit, that is, a block copolymer, terpolymer or crosslinked polymer, and they may be used alone or in combination of two or more.

Out of these, polyacetal copolymers are preferred. A copolymer containing not more than 2 wt % of an oxyalkylene unit having two adjacent carbon atoms in the main chain and a copolymer containing 0.2 to 1.4 wt % of an oxyalkylene unit having 4 adjacent carbon atoms in the main chain are more preferred. A copolymer containing not more than 2 wt % of an oxyalkylene unit having two adjacent carbon atoms in the main chain and a copolymer containing 0.5 to 3 w % of an oxyalkylene unit having 4 adjacent carbon atoms in the main chain are particularly preferred.

The viscosity of the polyacetal resin is not particularly limited if it can be used as a molding material.

The melt flow rate (MFR) of the polyacetal resin can be measured by the ASTM1238 method and is preferably 1.0 to 50 g/10 min, particularly preferably 1.3 to 35 g/10 min.

The polyacetal resin preferably contains at least one selected from 2,2'-methylenebis(4-methyl-6-t-butylphenol), calcium ricinoleate, cyanoguanidine, hexamethylenebis(3,5-di-t-butyl-4-hydroxyhydrocinnamate), melanine-formaldehyde resin, nylon 6/66, nylon 66/610/6, nylon 612/6, tetrakis[methylene(3.5-di-t-butyl-4-hydroxyhydrocinnamate)methane], 1,6-hexanediolbis[3-(3,5-di-t-butyl-4-hydroxyphenyl) propionate] and triethylene glycol[3-(3,5-di-t-butyl-5-methyl-4-hydroxyphenyl) propionate. When the polyacetal resin is contained, a molded article having excellent surface properties, moldability, mechanical properties, durability and toughness and a composition which provides the above molded article can be obtained.

The polyester resin is a polymer or copolymer obtained by polycondensing at least one selected from (1) a dicarboxylic acid or ester forming derivative thereof and a diol or ester forming derivative thereof, (2) a hydroxycarboxylic acid or ester forming derivative thereof and (3) lactone, and a thermoplastic polyester resin except for polylactic acid.

Examples of the above dicarboxylic acid or ester forming derivative thereof include aromatic dicarboxylic acids such as terephthalic acid, isophthalic acid, phthalic acid, 2,6-naphthalenedicarboxylic acid, 1,6-naphthalenedicarboxylic acid, 2,7-naphthalenedicarboxylic acid, bis(4-carboxyphenyl)methane, anthracenedicarboxylic acid, 4,4'-diphenyl ether dicarboxylic acid, 5-tetrabutylphosphonium sulfoisophthalic acid and 5-sodium sulfoisophthalic acid, aliphatic dicarboxylic acids such as oxalic acid, succinic acid and dimer acid, alicyclic dicarboxylic acids such as 1,3-cyclohexanedicarboxylic acid and 1,4-cyclohexanedicarboxylic acid, and ester forming derivatives thereof.

Examples of the above diol or ester forming derivative thereof include aliphatic glycols having 2 to 20 carbon atoms, such as ethylene glycol, 1,3-trimethylene glycol, 1,2-propylene glycol, 1,4-butanediol, neopentyl glycol, 1,5-pentanediol, 1,6-hexanediol, decamethylene glycol, 1,4-cyclohexane dimethanol, 1,4-cyclohexane diol and dimer diol. Long-chain glycols having a molecular weight of 200 to 100,000 such as polyethylene glycol, polytrimethylene glycol, polypropylene glycol and polytetramethylene glycol are also included.

Aromatic dihydroxy compounds such as 4,4'-dihydroxybiphenyl, hydroquinone, t-butyl hydroquinone, bisphenol A, bisphenol S and bisphenol F, and ester forming derivatives thereof are further included. Examples of the above hydroxycarboxylic acid include glycolic acid, hydroxypropionic acid, hydroxybutyric acid, hydroxyvaleric acid, hydroxycaproic acid, hydroxybenzoic acid, 6-hydroxy-2-naphthoic acid, and oligo- and poly-caprolactone, and ester forming derivatives thereof. Examples of the above lactone include caprolactone, valerolactone, propiolactone, undecalactone and 1,5-oxepan-2-one.

Examples of the above polymer or copolymer include aromatic polyesters such as polyethylene terephthalate, polyethylene(terephthalate/isophthalate), polyethylene naphthalate, poly1,3-trimethylene terephthalate, poly1,3-trimethylene (terephthalate/isophthalate), poly1,3-trimethylene naphthalate, polybutylene terephthalate, polybutylene (terephthalate/isophthalate), polybutylene naphthalate, polybutylene (terephthalate/isophthalate), copolymer of polybutylene terephthalate and polybutylene adipate blocks, copolymer of polybutylene terephthalate and poly-ε-caprolactone, bisphenol A (terephthalate/isophthalate), poly(cyclohexanedimethylene/ethylene)terephthalate, poly(1,4-cyclohexanedimethylene/ethylene) (terephthalate/isophthalate), polybutylene (terephthalate/isophthalate)/bisphenol A and polyethylene (terephthalate/isophthalate/bisphenol A. Further, copolymers obtained by copolymerizing a polyether or aliphatic polyester with an aromatic polyester such as polyethylene (terephthalate/succinate), polyethylene (terephthalate/adipate), polyethylene (terephthalate/sulfoisophthalate/adipate), polyethylene (terephthalate/adipate), polyethylene (terephthalate/sebacate), polycyclohexanedimethylene terephthalate, polycyclohexanedimethylene (terephthalate/isophthalate), polybutylene (terephthalate/succinate), polybutylene (terephthalate/adipate), polybutylene (terephthalate/sebacate), polyether ester copolymer of polyethylene terephthalate and polyethylene glycol, polyether ester copolymer of polybutylene terephthalate and polyethylene glycol, block copolymer of polybutylene terephthalate and poly(tetramethylene oxide) glycol, bock copolymer of polybutylene terephthalate/isophthalate and poly(tetramethylene oxide)glycol, block copolymer of polybutylene terephthalate and poly (polyethylene oxide/polypropylene oxide)glycol, block copolymer of polybutylene (terephthalate/isophthalate) and poly(polyethylene oxide/polypropylene oxide) glycol, block copolymer of polybutylene terephthalate and polybutylene adipate, copolymer of polybutylene terephthalate and poly-ε-caprolactone are also included. Polyhydroxy alkanoates such as polyethylene oxalate, polybutylene oxalate, polyneopentyl glycol oxalate, polyethylene succinate, polybutylene succinate, polybutylene adipate, polyethylene adipate, polybutylene (succinate/adipate), polyethylene (succinate/adipate) and copolymer of polyhydroxybutyric acid, β-hydroxybutyric acid and β-hydroxyvaleric acid, polycaprolactones, and aliphatic polyesters such as polybutylene succinate-carbonate are also included. Copolymerization liquid crystal polyesters such as p-oxybenzoic acid/polyethylene terephthalate and p-oxybenzoic acid/6-oxy-2-naphthoic acid are further included.

Out of these, a polymer obtained by polycondensing an aromatic dicarboxylic acid or ester forming derivative thereof and an aliphatic diol or ester forming derivatives thereof as the main components is preferred. Preferred examples of the polymer include polybutylene terephthalate, polytrimethylene terephthalate, polyethylene terephthalate, poly(cyclohexanedimethylene/ethylene) terephthalate, polybutylene naphthalate, polybutylene terephthalate/isophthalate, polyethylene terephthalate/isophthalate, polyether ester copolymer of polybutylene terephthalate and polyethylene glycol, polyether ester copolymer of polyethylene terephthalate and polyethylene glycol, polyether ester copolymer of polybutylene terephthalate and poly(tetramethylene oxide) glycol, polyether ester copolymer of polybutylene terephthalate/isophthalate and poly(tetramethylene oxide)glycol, polybutylene (terephthalate/adipate) and polyethylene (terephthalate/adipate).

The ratio of the aromatic dicarboxylic acid or ester forming derivative thereof to the total of all dicarboxylic acids in the polymer obtained by polycondensing the above aromatic dicarboxylic acid or ester forming derivative thereof and the aliphatic diol or ester forming derivative thereof as the main components is preferably not less than 50 mol %, more preferably not less than 60 mol %.

Out of these, a polymer obtained by polycondensing terephthalic acid or ester forming derivative thereof and butanediol or ester forming derivative thereof as the main components is more preferred. Preferred examples of the polymer include polybutylene terephthalate, polybutylene (terephthalate/isophthalate), polyether ester copolymer of polybutylene terephthalate and polyethylene glycol, polyether ester copolymer of polybutylene terephthalate and poly (tetramethylene oxide)glycol, polyether ester copolymer of polybutylene (terephthalate/isophthalate) and poly(tetramethylene oxide)glycol, and polybutylene (terephthalate/adipate). The ratio of terephthalic acid or ester forming derivative thereof to the total of all dicarboxylic acids in the polymer obtained by polycondensing the above terephthalic acid or ester forming derivative thereof and butanediol or ester forming derivative thereof as the main components is preferably not less than 50 mol %, more preferably not less than 60 mol %.

Preferred examples of the thermoplastic polyester resin used in the present invention include polyester carbonates and polyhydroxy alkanoates, such as polybutylene succinate-carbonate, polyhydroxybutyric acid and copolymer of β-hydroxybutyric acid and β-hydroxyvaleric acid. They may be used alone or in combination of two or more.

A resin composition and molded article having excellent surface properties, moldability, mechanical properties, heat resistance and toughness are obtained by mixing a thermoplastic polyester in the present invention.

The polyamide resin is a thermoplastic resin having an amide bond obtained from an amino acid, lactam or diamine and a dicarboxylic acid as starting materials.

Examples of the amino acid include 6-aminocaproic acid, 11-aminoundecanoic acid, 12-aminododecanoic acid and paraminomethylbenzoic acid. Examples of the lactam include ε-caprolactam and ω-laurolactam. Examples of the diamine include tetramethylenediamine, hexamethylenediamine, undecamethylenediamine, dodecamethylenediamine, 2,2,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis (aminopropyl)piperazine and aminoethylpiperazine.

Examples of the dicarboxylic acid include adipic acid, suberic acid, azelaic acid, sebacic acid, dodecanedioic acid, terephthalic acid, isophthalic acid, naphthalenedicarboxylic acid, 2-chloroterephthalic acid, 2-methylterephthalic acid, 5-methylisophthalic acid, 5-sodium sulfoisophthalic acid, hexahydroterephthalic acid and diglycolic acid.

Preferred examples of the polyamide used in the present invention include polycaproamide (nylon 6), polytetramethyleneadipoamide (nylon 46), polyhexamethyleneadipoamide (nylon 66), polyhexamethylenesebacamide (nylon 610), polyhexamethylenedodecamide (nylon 612), polyundecamethyleneadipoamide (nylon 116), polyundecaneamide (nylon 11), polydodecaneamide (nylon 12), polyterephthalamide (nylon 11T(H)), and copolyamides and mixed polyamides thereof. Out of these, nylon 6, nylon 11, nylon 12, nylon 610, nylon 612, nylon 116 and copolyamides and mixed polyamides thereof are preferred, and nylon 6, nylon 11 and nylon 12 are particularly preferred.

The melting point of the polyamide resin used is preferably 90 to 230° C. from the viewpoint of the heat stabilities of the polylactic acid (component A) and the filler. In the present invention, a resin composition and molded article having excellent surface properties, moldability, mechanical properties, heat resistance and toughness can be obtained by mixing a polyamide resin.

The polycarbonate resin comprises a recurring unit represented by the following formula (10).

—O—K$^1$—O—CO—    (10)

In the formula (10), K$^1$ is an alkylene group having 2 to 20 carbon atoms, which may have a substituent, cycloalkylene group having 6 to 20 carbon atoms, which may have a substituent, arylene having 6 to 20 carbon atoms, which may have a substituent, arylene alkylene arylene group or arylene alkylidene arylene group. K$^1$ may be a plurality of groups.

The polycarbonate resin is produced from a reaction between a dihydroxy compound and a carbonate bond forming compound. At present industrially, when phosgene is used as the carbonate forming compound, interfacial polymerization is employed, and when a diphenyl carbonate is used as the carbonate forming compound, melt polymerization is employed. Both polycarbonates which are produced by interfacial polymerization and melt polymerization may be used satisfactorily.

Aliphatic dihydroxy compounds include aliphatic glycols having 2 to 20 carbon atoms, such as ethylene glycol, 1,3-trimethylene glycol, 1,2-propylene glycol, 1,4-butanediol, neopentyl glycol, 1,5-pentanediol, 1,6-hexanediol, decamethylene glycol, 1,4-cyclohexane dimethanol, 1,4-cyclohexane diol and dimer diol, and long-chain glycols having a molecular weight of 200 to 100,000, such as polyethylene glycol, polytrimethylene glycol, polypropylene glycol and polytetramethylene glycol.

Aromatic dihydroxy compounds include 4,4'-dihydroxydiphenyl, bis(4-hydroxyphenyl)methane, 1,1-bis(4-hydroxyphenyl)ethane, 1,1-bis(4-hydroxyphenyl)-1-phenylethane, 2,2-bis(4-hydroxyphenyl)propane (so-called "bisphenol A"), 2,2-bis(4-hydroxy-3-methylphenyl)propane, 2,2-bis(4-hydroxy-3-phenylphenyl)propane, 1,1-bis(4-hydroxyphenyl) cyclohexane, 1,1-bis(4-hydroxyphenyl)-3,3,5-trimethylcyclohexane, 9,9-bis(4-hydroxyphenyl)fluorene, 9,9-bis(4-hydroxy-3-methylphenyl)fluorene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 2,2,2',2'-tetrahydro-3,3,3',3'-tetramethyl-1,1'-spirobis[1H-indene]-6,6'-diol, 4,4'-dihydroxydiphenylsulfone, 4,4'-dihdyroxydiphenyl sulfoxide, 4,4'-dihydroxydiphenyl sulfide, 4,4'-dihydroxydiphenyl ketone and 4,4'-dihydroxydiphenyl ether. They may be used alone or in combination of two or more.

A homopolymer or copolymer obtained from at least one bisphenol selected from the group consisting of bisphenol A, 2,2-bis(4-hydroxy-3-methylphenyl)propane, 9,9-bis(4-hydroxyphenyl)fluorene, 9,9-bis(4-hydroxy-3-methylphenyl) fluorene, 1,1-bis(4-hydroxyphenyl)cyclohexane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer containing bisphenol A as the main component are particularly preferably used.

It is possible to incorporate a monomer except for the above one bisphenol into the main chain of a polycarbonate for a desired purpose in limits not prejudicial to the object of the present invention by a conventional method.

For example, it is possible to introduce an aliphatic or alicyclic diol or polyol such as ethylene glycol, 1,4-butanediol, polyethylene glycol, 1,4-cyclohexane dimethanol, 3,9-bis(1,1-dimethyl-2-hydroxyethyl)-2,4,8,10-tetraoxaspiro [5.5] undecane or tricyclodecane dimethanol,
out of polymers containing the carbonate unit of an aromatic dihydroxy compound as the main recurring unit, to attain a desired purpose.

Further, aromatic polyhydroxy compounds such as 1,1,1-tris(4-hydroxyphenyl)ethane and 1,1,2,2-tetrakis(3-methyl-4-hydroxyphenyl)ethane, aliphatic and aromatic oxycarboxylic acids such as lactic acid, p-hydroxybenzoic acid and 6-hydroxy-2-naphthoic acid, aromatic oxycarboxylic acid, dicarboxylic acids such as adipic acid, dodecanedioic acid, terephthalic acid, 2,6-naphthalenedicarboxylic acid, pyromellitic acid and trimellitic acid, and polycarboxylic acids are enumerated as examples of the monomer which can be introduced.

In the present invention, a resin composition and molded article having excellent surface properties, moldability, mechanical properties, heat resistance and toughness can be obtained by mixing a polycarbonate resin.

The content of the component D is preferably 0.5 to 200 parts by weight, more preferably 1 to 100 parts by weight, much more preferably 3 to 70 parts by weight, particularly preferably 5 to 50 parts by weight based on 100 parts by weight of the component A. A composition and molded article having excellent properties can be obtained by mixing these resins.

<Stabilizer: Component E>

The resin composition of the present invention preferably comprises a stabilizer (component E). A stabilizer which is used as a stabilizer for thermoplastic resins may be generally used as the component E. The stabilizer is, for example, an antioxidant or an optical stabilizer. By mixing a stabilizer, a composition and molded article having excellent mechanical properties, moldability, heat resistance and durability can be obtained.

Examples of the antioxidant include hindered phenol-based compounds, hindered amine-based compounds, phosphite-based compounds and thioether-based compounds.

The hindered phenol-based compounds include n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis[3-(3,5-di-t-butyl-4-hydroxyphenyl)-propionate], 1,4-butanediol-bis[3-(3,5-di-t-butyl-4-hydroxyphenyl)-propionate], 2,2'-methylene-bis(4-methyl-t-butylphenol), triethylene glycol-bis[3-(3-t-butyl-5-methyl-4-hydroxyphenyl)-propionate], tetrakis[methylene-3-(3',5'-di-t-butyl-4-hydroxyphenyl) propionate]methane and 3,9-bis[2-{3-(3-t-butyl-4-hydroxy-5-methylphenyl) propionyloxy}-1,1-dimethylethyl]2,4,8,10-tetraoxaspiro (5,5)undecane.

The hindered amine-based compounds include N,N'-bis-3-(3',5'-di-t-butyl-4'-hydroxyphenyl) propionylhexamethylenediamine, N,N'-tetramethylene-bis[3-(3'-methyl-5'-t-butyl-4'-hydroxyphenyl)propionyl]diamine, N,N'-bis[3-(3,5-di-t-butyl-4-hydroxyphenyl)-propionyl]hydrazine, N-salicyloyl-N'-salicylidenehydrazine, 3-(N-salicyloyl) amino-1,2,4-triazole and N,N'-bis[2-{3-(3,5-di-t-butyl-4-hydroxyphenyl) propionyloxy}ethyl]oxyamide. Out of these, triethylene glycol-bis[3-(3-t-butyl-5-methyl-4-hydroxyphenyl)-propionate]and tetrakis[methylene-3-(3',5'-di-t-butyl-4-hydroxyphenyl) propionate]methane are particularly preferred.

The phosphite-based compounds are preferably compounds having at least one P—O bond bonded to an aromatic group, such as tris(2,6-di-t-butylphenyl)phosphite, tetrakis(2,6-di-t-butylphenyl)4,4'-biphenylenephosphite, bis(2,6-di-t-butyl-4-methylphenyl)pentaerythritol-di-phosphite, 2,2-methylenebis(4,6-di-t-butylphenyl)octylphosphite, 4,4'-butylidene-bis(3-methyl-6-t-butylphenyl-di-tridecyl) phosphite, 1,1,3-tris(2-methyl-4-ditridecylphosphite-5-t-butylphenyl)butane, tris(mixed mono- and di-nonylphenyl) phosphite, tris(nonylphenyl)phosphite and 4,4'-isopropylidenebis(phenyl-dialkylphosphite).

Out of these, tris(2,6-di-t-butylphenyl)phosphite, 2,2-methylenebis(4,6-di-t-butylphenyl)octylphosphite, bis(2,6-di-t-butyl-4-methylphenyl)pentaerythritol-di-phosphite and tetrakis(2,6-di-t-butylphenyl)-4,4'-biphenylenephosphite may be preferably used.

The thioether-based compounds include dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecylthiopropionate), pentaerythritol-tetrakis(3-myristylthiopropionate) and pentaerythritol-tetrakis(3-stearylthiopropionate).

Examples of the optical stabilizer include benzophenone-based compounds, benzotriazole-based compounds, aromatic benzoate-based compounds, oxalic acid anilide-based compounds, cyanoacrylate-based compounds and hindered amine-based compounds.

The benzophenone-based compounds include benzophenone, 2,4-dihydroxybenzophenone, 2,2'-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-octoxybenzophenone, 2-hydroxy-4-dodecyloxybenzophenone, 2-hydroxy-4-octoxybenzophenone, 2-hydroxy-4-methoxy-5-sulfobenzophenone, 5-chloro-2-hydroxybenzophenone, 2-hydroxy-4-octoxybenzophenone, 2-hydroxy-4-methoxy-2'-carboxybenzophenone and 2-hydroxy-4-(2-hydroxy-3-methyl-acryloxyisopropoxy)benzophenone.

The benzotriazole-based compounds include 2-(5-methyl-2-hydroxyphenyl)benzotriazole, 2-(3,5-di-t-butyl-2-hydroxyphenyl)benzotriazole, 2-(3,5-di-t-amyl-2-hydroxyphenyl)benzotriazole, 2-(3',5'-di-t-butyl-4'-methyl-2'-hydroxyphenyl)benzotriazole, 2-(3,5-di-t-amyl-2-hydroxyphenyl)-5-chlorobenzotriazole, 2-(5-t-butyl-2-hydroxyphenyl)benzotriazole, 2-[2'-hydroxy-3',5'-bis($\alpha,\alpha$-dimethylbenzyl)phenyl]benzotriazole, 2-[2'-hydroxy-3',5'-bis($\alpha,\alpha$-dimethylbenzyl)phenyl]-2H-benzotriazole and 2-(4'-octoxy-2'-hydroxyphenyl)benzotriazole.

The aromatic benzoate-based compounds include alkylphenyl salicylates such as p-t-butylphenyl salicylate and p-octylphenyl salicylate.

The oxalic acid anilide-based compounds include 2-ethoxy-2'-ethyloxalic acid bisanilide, 2-ethoxy-5-t-butyl-2'-ethyloxalic acid bisanilide and 2-ethoxy-3'-dodecyloxalic acid bisanilide.

The cyanoacrylate-based compounds include ethyl-2-cyano-3,3'-diphenyl acrylate and 2-ethylhexyl-cyano-3,3'-diphenyl acrylate.

The hindered amine-based compounds include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-octadecyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethylpi-4-peridyl)adipate, bis(2,2,6,6-tetramethylpi-4-peridyl)terephthalate, 1,2-bis(2,2,6,6-tetramethylpi-4-peridyloxy)-ethane, $\alpha,\alpha'$-bis(2,2,6,6-tetramethylpi-4-peridyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris (2,2,6,6-tetramethyl-4-piperidyl)-benzene-1,3,5-tricarboxylate, tris (2,2,6,6-tetramethyl-4-piperidyl)-benzene-1,3,4-tricarboxylate, 1-[2-{3-(3,5-di-t-butyl-4-hydroxyphenyl)propionyloxy}-2,2,6,6-tetramethylpiperidine, and condensate of 1,2,3,4-butanetetracarboxylic acid, 1,2,2,6,6-pentamethyl-4-piperidinol and $\beta,\beta,\beta',\beta'$-tetramethyl-3,9-[2,4,8,10-tetraoxaspiro(5,5) undecane]dimethanol. In the present invention, these components E may be used alone or in combination of two or more.

The stabilizer (component E) is preferably at least one selected from a hindered phenol-based compound, hindered amine-based compound, phosphite-based compound, thioether-based compound and optical stabilizer. The component E is preferably a hindered phenol-based compound or a benzotriazole-based compound. The content of the component E is preferably 0.01 to 3 parts by weight, more preferably 0.03 to 2 parts by weight based on 100 parts by weight of the component A.

<Crystallization Accelerator: Component F>

The composition of the present invention may comprise an organic or inorganic crystallization accelerator (component F). When the component F is contained, the function of the phosphoric acid ester metal salt (component B) can be further strengthened and a composition having excellent mechanical properties, heat resistance and moldability can be obtained.

When the component F is contained in a composition comprising a polylactic acid (component A), a polycarbodiimide (component B) and a phosphoric acid ester metal salt (component C), a composition having excellent moldability and heat resistance is obtained and a molded article which is fully crystallized even by ordinary injection molding and has excellent heat resistance can be obtained. In addition, the time required for the manufacture of a molded article can be greatly shortened, whereby the economical effect of the component F is large.

A crystal nucleating agent which is generally used for polymers may be used as the crystallization nucleating agent used as the component F in the present invention. Both inorganic crystal nucleating agents and organic crystal nucleating agents may be used.

The inorganic crystal nucleating agents include talc, kaolin, silica, synthetic mica, clay, zeolite, graphite, carbon black, zinc oxide, magnesium oxide, titanium oxide, calcium carbonate, calcium sulfate, barium sulfate, calcium sulfide, boron nitride, montmorillonite, neodymium oxide, aluminum oxide, phenylphosphonate metal salts and triclinic inorganic nucleating agents. These inorganic crystal nucleating agents are preferably treated with a dispersion aid to improve their dispersibility in the composition.

Although the triclinic inorganic nucleating agents are effective as a crystal nucleating agent for the stereocomplex crystal as they have the same triclinic crystal lattice as the stereocomplex crystal, they hardly function as a crystal nucleating agent for the homo crystal which belongs to the orthorhombic system. As a result, they retard the growth of the homo crystal and can promote the growth of the stereocomplex crystal during the retardation. The triclinic inorganic nucleating agents include calcium dihydrogenphosphate•monohydrate, calcium metasilicate, sodium hydrogensulfate and sodium perborate. Out of these, calcium metasilicate is preferred because it suppresses a reduction in molecular weight.

When the content of the triclinic inorganic nucleating agent is lower than 0.01 part by weight, the content of the homo crystal increases and when the content is higher than 10 parts by weight, it re-agglomerates and its efficacy as a crystal nucleating agent degrades. The average particle diameter of the triclinic inorganic nucleating agent is preferably not less than 0.1 μm and less than 10 μm. Within this range, the crystallization of the stereocomplex crystal proceeds efficiently. The average particle diameter of the triclinic inorganic nucleating agent is more preferably not less than 0.5 μm and less than 10 μm. The static scattering method using an argon laser or helium laser can be named as the most practical method for measuring the average particle diameter. The content of the triclinic inorganic nucleating agent in the composition of the present invention is preferably 0.01 to 10 parts by weight, more preferably 0.1 to 5 parts by weight, much more preferably 0.5 to 2 parts by weight based on 100 parts by weight of the polylactic acid (component A).

The organic crystal nucleating agents include organic carboxylic acid metal salts such as calcium benzoate, sodium benzoate, lithium benzoate, potassium benzoate, magnesium benzoate, barium benzoate, calcium oxalate, disodium terephthalate, dilithium terephthalate, dipotassium terephthalate, sodium laurate, potassium laurate, sodium myristate, potassium myristate, calcium myristate, barium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, sodium β-naphthoate, potassium β-naphthoate and sodium cyclohexanecarboxylate, and organic sulfonic acid metal salts such as sodium p-toluenesulfonate and sodium sulfoisophthalate.

Organic carboxylic acid amides such as stearic acid amide, ethylenebis lauric acid amide, palmitic acid amide, hydroxystearic acid amide, erucic acid amide and tris(t-butylamide) trimesate, low-density polyethylene, high-density polyethylene, polyisopropylene, polybutene, poly-4-methylpentene, poly-3-methylbutene-1, polyvinyl cycloalkane, polyvinyl trialkylsilane, high-melting point polylactic acid, sodium salts of an ethylene-acrylic acid copolymer, sodium salts of a styrene-maleic anhydride copolymer (so-called "ionomer"), and benzylidene sorbitol and derivatives thereof such as dibenzylidene sorbitol are also included in the above examples.

Out of these, at least one selected from triclinic inorganic nucleating agents, talc and organic carboxylic acid metal salts is preferably used. The above crystal nucleating agents may be used alone or in combination of two or more in the present invention.

The content of the component F is preferably 0.01 to 30 parts by weight, more preferably 0.05 to 20 parts by weight based on 100 parts by weight of the component A.

<Filler: Component G>

The composition of the present invention may comprise an organic or inorganic filler (component G). When the component G is contained, a composition having excellent mechanical properties, heat resistance and metal moldability can be obtained.

Examples of the organic filler include chip-like fillers such as rice husks, wood chips, bean curd refuse, crushed waste paper and crushed apparel, plant fibers such as cotton fibers, hemp fibers, bamboo fibers, wood fibers, kenaf fibers, jute fibers, banana fibers and coconut fibers, and pulp and cellulose fibers obtained from these plant fibers. Animal fibers such as silk, wool, Angora, cashmere and camel fibers are also included in the above examples. Synthetic fibers such as polyester fibers, nylon fibers and acrylic fibers are further included. Powdery fillers such as paper powders, wood powders, cellulose powders, rice husk powders, fruit shell powders, chitin powders, chitosan powders, protein powders and starch powders are still further included. Paper powders, wood powders, bamboo powders, cellulose powders, kenaf powders, rice husk powders, fruit shell powders, chitin powders, chitosan powders, protein powders and starch powders are preferred from the viewpoint of moldability. Paper powders, wood powders, bamboo powders, cellulose powders and kenaf powders are more preferred. Paper powders and wood powders are much more preferred. Paper powders are particularly preferred.

Organic fillers obtained directly from natural products may be used but organic fillers recycled from waste materials such as waste paper, waste wood and used clothing may also be used. Wastepaper includes newspapers, magazines and other regenerated pulp, paperboards such as cardboards, boxboards and paper cores, and others which are obtained from plant fibers. Crushed newspapers and crushed paper boards such as cardboards, boxboards and paper cores are preferred from the viewpoint of moldability. Coniferous trees such as yellow pine, cedar, cypress and fir, and broadleaf trees such as beech, chinquapin and eucalyptus are preferred as timber.

Paper powders preferably contain an adhesive from the viewpoint of moldability. The adhesive is not particularly limited if it is generally used to process paper. Examples of the adhesive include emulsion adhesives such as vinyl acetate resin-based emulsion and acrylic resin-based emulsion, polyvinyl alcohol-based adhesives, cellulose-based adhesives, natural rubber-based adhesives, starch paste and ethylene-vinyl acetate copolymer resin adhesives, and hot melt adhesives such as polyamide-based adhesives. Out of these, emulsion adhesives, polyvinyl alcohol-based adhesives and hot melt adhesives are preferred, and emulsion adhesives and polyvinyl alcohol-based adhesives are more preferred.

The adhesive is also used as a binder for paper processing. The adhesive preferably contains an inorganic filler such as clay, talc, kaolin, montmorillonite, mica, synthetic mica, zeolite, silica, graphite, carbon black, magnesium oxide, calcium oxide, titanium oxide, aluminum oxide, neodymium oxide, calcium sulfide, magnesium carbonate, calcium carbonate, barium carbonate or barium sulfate. Out of these, clay, talc, kaolin, montmorillonite, mica, synthetic mica, zeolite and silica are more preferred.

Chemicals which are generally used as papermaking raw materials, for example, organic substances such as rosin-based, alkyl ketene dimer-based or alkenyl succinic anhydride-based sizing agent, polyacrylamide-based paper reinforcing agent, polyethylene imine yield improving agent, polymer aggregating agent, filterability improving agent, deinking agent such as nonionic surfactant, organic halogen-based slime control agent, organic or enzyme-based pitch control agent, hydrogen peroxide cleaning agent, antifoam agent, pigment dispersing agent and lubricant agent, and inorganic substances such as aluminum sulfate used as a fixing agent for sizing agents and sodium hydroxide, magnesium hydroxide, sodium sulfate, sodium silicate, aluminum chloride and sodium chlorate used as papermaking raw materials are preferably contained in paper powders from the viewpoint of moldability.

In the composition of the present invention, the content of the organic filler is preferably 1 to 300 parts by weight, more preferably 5 to 200 parts by weight, much more preferably 10 to 150 parts by weight, particularly preferably 15 to 100 parts by weight based on 100 parts by weight of the component A from the viewpoints of moldability and heat resistance. When the content of the organic filler is lower than 1 part by weight, the effect of improving the moldability of the composition becomes small and when the content is higher than 300 parts by weight, it is difficult to disperse the filler uniformly, or the moldability and heat resistance as well as strength and appearance of the composition as a material may deteriorate disadvantageously.

The composition of the present invention preferably contains an inorganic filler. When the inorganic filler is contained, a composition having excellent mechanical properties, heat resistance and moldability can be obtained. The inorganic filler used in the present invention is a fibrous, lamellar or powdery filler which is used to reinforce an ordinary thermoplastic resin.

Examples of the inorganic filler include fibrous inorganic fillers such as glass fibers, asbestos fibers, carbon fibers, graphite fibers, metal fibers, potassium titanate whiskers, aluminum borate whiskers, magnesium-based whiskers, silicon-based whiskers, wollastonite, imogolite, sepiolite, asbestos, slug fibers, zonolite, elestite, gypsum fibers, silica fibers, silica-alumina fibers, zirconia fibers, boron nitride fibers, silicon nitride fibers and boron fibers. Examples of the lamellar and particulate inorganic fillers include lamellar silicates, lamellar silicates exchanged with an organic onium ion, glass flakes, non-swellable mica, graphite, metal foils, ceramic beads, talc, clay, mica, sericite, zeolite, bentonite, dolomite, kaolin, powdery silicic acid, feldspar powder, potassium titanate, Shirasu balloon, calcium carbonate, magnesium carbonate, barium sulfate, calcium oxide, aluminum oxide, titanium oxide, aluminum silicate, silicon oxide, gypsum, novaculite, dawsonite and white clay.

The lamellar silicates exchanged with an organic onium ion are clathrate compounds whose exchangeable cation existent between layers is exchanged with an organic onium ion. The lamellar silicates having an exchangeable cation between layers has a structure that plate-like layers having a width of 0.05 to 0.5 μm and a thickness of 6 to 15 Å are laminated together and exchangeable cations between plate-like layers. The cation exchange capacity is 0.2 to 3 meq/g, preferably 0.8 to 1.5 meq/g.

The lamellar silicates include smectite-based clay minerals such as montmorillonite, beidellite, nontronite, saponite, hectorite and sorconite, clay minerals such as verculite, halocite, kanemite and kenyaite, and swellable micas such as Li-type fluorotaeniolite, Na-type fluorotaeniolite, Li-type tetrasilicic fluoromica and Na-type tetrasilicic fluoromica. They may be natural or synthetic. Out of these, smectite-based clay minerals such as montmorillonite and hextorite, and swellable synthetic micas such as Li-type fluorotaeniolite and Na-type tetrasilicic fluoromica are preferred.

Examples of the cation and the organic onium ion to be exchanged include ammonium ion, phosphonium ion and sulfonium ion. Out of these, ammonium ion and phosphonium ion are preferred, and ammonium ion is particularly preferred because it has high ion exchangeability. The ammonium ion may be either one of primary to quaternary ammonium ions.

Examples of the primary ammonium ion include decyl, dodecyl ammonium, octadecyl ammonium, oleyl ammonium and benzyl ammonium. Examples of the secondary ammonium ion include methyl dodecyl ammonium and methyl octadecyl ammonium. Examples of the tertiary ammonium ion include dimethyl dodecyl ammonium and dimethyl octadecyl ammonium. Examples of the quaternary ammonium ion include benzyl trialkyl ammonium ions such as benzyl trimethyl ammonium, benzyl triethyl ammonium, benzyl tributyl ammonium, benzyl dimethyl dodecyl ammonium, benzyl dimethyl octadecyl ammonium and benzalkonium. Alkyl trimethyl ammonium ions such as trimethyl octyl ammonium, trimethyl dodecyl ammonium and trimethyl octadecyl ammonium are also included. Dimethyl dioctyl ammonium, dimethyl didodecyl ammonium, dimethyl dioctadecyl ammonium, dimethyl dialkyl ammonium ions, trioctyl ammonium, tridecyl ammonium ion and benzethonium ion having two benzene rings are further included.

In addition to these, ammonium ions derived from aniline, p-phenylenediamine, α-naphthylamine, p-aminodimethylaniline, benzidine, pyridine, piperidine, 6-aminocaproic acid, 11-aminoundecanoic acid, 12-aminododecanoic acid and polyalkylene glycols having an amino group at a terminal are still further included.

Out of these ammonium ions, trioctyl methyl ammonium, benzyl dimethyl dodecyl ammonium, benzyl dimethyl octadecyl ammonium and benzalkonium are preferred. These ammonium ions can be generally acquired as a mixture. In this case, each of the above compounds should be understood as the name of a typical compound including a small amount of a closely-related form. They may be used alone or in combination.

Ammonium ions having a reactive functional group or high affinity are preferred, and ammonium ions derived from 12-aminododecanoic acid and polyalkylene glycols having an amino group at a terminal are also preferred.

The lamellar silicates whose exchangeable cation existent between layers is exchanged with an organic onium ion and which is used in the present invention can be easily produced by reacting a lamellar silicate having an exchangeable cation between layers with an organic onium ion in accordance with a known method. For example, they can be produced through an ion exchange reaction in a polar solvent such as water, methanol or ethanol or a direct reaction between a lamellar silicate and a liquid or molten ammonium salt.

The amount of the organic onium ion to be used with the lamellar silicate in the present invention is preferably 0.4 to 2 equivalents, more preferably 0.8 to 1.2 equivalents based on the cation exchange capacity of the lamellar silicate from the viewpoints of the dispersibility of the lamellar silicate, heat stability at the time of melting, the gas generated at the time of molding and the generation of an odor.

It is preferred that the lamellar silicates should be pretreated with a coupling agent having a reactive functional group in addition to the above organic onium salt before use in order to obtain more excellent mechanical properties. Examples of the coupling agent having a reactive functional group include isocyanate-based compounds, organic silane-based compounds, organic titanate-based compounds, organic borane-based compounds and epoxy compounds.

Out of these inorganic fillers, fibrous or lamellar inorganic fillers are preferred, and glass fibers, wollastonite, aluminum borate whiskers, potassium titanate whiskers, mica, kaolin and cation exchanged lamellar silicates are particularly preferred. The aspect ratio of the fibrous filler is preferably 5 or more, more preferably 10 or more, much more preferably 20 or more.

The filler may be covered with or bundled up by a thermoplastic resin such as an ethylene-vinyl acetate copolymer or thermosetting resin such as epoxy resin, or treated with a coupling agent such as aminosilane or epoxysilane.

The content of the inorganic filler is preferably 0.1 to 200 parts by weight, more preferably 0.5 to 100 parts by weight, much more preferably 1 to 50 parts by weight, particularly preferably 1 to 30 parts by weight, most preferably 1 to 20 parts by weight based on 100 parts by weight of the polylactic acid (component A).

<Release Agent: Component H>

The composition of the present invention may comprise a release agent (component H). As the component H used in the present invention may be used what is used in an ordinary thermoplastic resin.

Examples of the component H include fatty acids, fatty acid metal salts, oxyfatty acids, paraffins, low molecular weight polyolefins, fatty acid amides, alkylenebis fatty acid amides, aliphatic ketones, fatty acid partially saponified esters, fatty acid lower alcohol esters, fatty acid polyhydric alcohol esters, fatty acid polyglycol esters and modified silicones. When the component H is contained, a polylactic acid composition and molded article having excellent mechanical properties, moldability and heat resistance can be obtained.

The fatty acids preferably have 6 to 40 carbon atoms, as exemplified by oleic acid, stearic acid, lauric acid, hydroxystearic acid, behenic acid, arachidonic acid, linoleic acid, linolenic acid, ricinoleic acid, palmitic acid, montanic acid and mixtures thereof. The fatty acid metal salts are preferably alkali (earth) metal salts of a fatty acid having 6 to 40 carbon atoms, as exemplified by calcium stearate, sodium montanate and calcium montanate.

The oxyfatty acids include 1,2-oxystearic acid. The paraffins preferably have 18 or more carbon atoms, as exemplified by liquid paraffin, natural paraffin, microcrystalline wax and petrolatum.

The low molecular weight polyolefins preferably have a molecular weight of 5,000 or less, as exemplified by polyethylene wax, maleic acid modified polyethylene wax, oxide type polyethylene wax, chlorinated polyethylene wax and polypropylene wax. The fatty acid amides preferably have 6 or more carbon atoms, as exemplified by aleinic acid amide, erucic acid amide and behenic acid amide.

The alkylenebis fatty acid amides preferably have 6 or more carbon atoms, as exemplified by methylenebis stearic acid amide, ethylenebis stearic acid amide and N,N-bis(2-hydroxyethyl)stearic acid amide.

The aliphatic ketones preferably have 6 or more carbon atoms, as exemplified by higher aliphatic ketones.

The fatty acid partially saponified esters include montanic acid partially saponified esters.

The fatty acid lower alcohol esters include stearic acid esters, oleic acid esters, linoleic acid esters, linolenic acid esters, adipic acid esters, behenic acid esters, arachidonic acid esters, montanic acid esters and isostearic acid esters.

The fatty acid polyhydric alcohol esters include glycerol tristearate, glycerol distearate, glycerol monostearate, pentaerythritol tetrastearate, pentaerythritol tristearate, pentaerythritol dimyristate, pentaerythritol monostearate, pentaerythritol adipate stearate and sorbitan monobehenate.

The fatty acid polyglycol esters include polyethylene glycol fatty acid esters and polypropylene glycol fatty acid esters.

The modified silicones include polyether modified silicone, higher fatty acid alkoxy modified silicone, higher fatty acid-containing silicone, higher fatty acid ester modified silicone, methacryl modified silicone and fluorine modified silicone.

Out of these, fatty acids, fatty acid metal salts, oxyfatty acids, fatty acid esters, fatty acid partially saponified esters, paraffins, low molecular weight polyolefins, fatty acid amides and alkylenebis fatty acid amides are preferred. Fatty acid partially saponified esters and alkylenebis fatty acid amides are more preferred. Montanic acid esters, montanic acid partially saponified esters, polyethylene wax, oxide polyethylene wax, sorbitan fatty acid esters, erucic acid amide and ethylenebis stearic acid amide are much more preferred, and montanic acid partially saponified esters and ethylenebis stearic acid amide are particularly preferred.

The release agents (component H) may be used alone or in combination of two or more. The content of the component H is preferably 0.01 to 3 parts by weight, more preferably 0.03 to 2 parts by weight based on 100 parts by weight of the component A.

(Antistatic Agent: Component I)

The composition of the present invention may comprise an antistatic agent (component I). Examples of the antistatic agent (component I) include quaternary ammonium salts-based and sulfonate-based compounds such as (β-lauramidepropionyl)trimethylammonium sulfate and sodium dodecylbenzenesulfonate, and alkyl phosphate-based compounds.

In the present invention, the antistatic agents may be used alone or in combination of two or more. The content of the component I is preferably 0.05 to 5 parts by weight, more preferably 0.1 to 5 parts by weight based on 100 parts by weight of the component A.

<Carboxyl Group Reactive Terminal Capping Agent: Component J>

In the present invention, a carboxyl group reactive terminal capping agent (component J) is preferably contained. The component J is not particularly limited if it can cap the carboxyl terminal group of a polymer.

The component J caps not only the terminal carboxyl group of the polylactic acid but also a carboxyl group produced by the decomposition reaction of the polylactic acid or additives and the carboxyl group of a low molecular weight compound such as lactic acid or formic acid. The component J is preferably a compound which can cap not only a carboxyl group but also a terminal hydroxyl group produced by the thermal decomposition of an acidic low molecular weight compound or water entering a resin composition.

The component J is preferably at least one compound selected from epoxy compound, oxazoline compound, oxazine compound and isocyanate compound, particularly preferably at least one compound selected from epoxy compound, oxazoline compound and isocyanate compound.

The epoxy compound is preferably selected from glycidyl ether compound, glycidyl ester compound, glycidyl amine compound, glycidyl imide compound, glycidyl amide compound and alicyclic epoxy compound. When the component J is contained, not only the function of the carbodiimide compound (component B) can be improved but also a composition and molded article having excellent mechanical properties, moldability, heat resistance and durability can be obtained.

Examples of the glycidyl ether compound include butyl glycidyl ether, stearyl glycidyl ether, allyl glycidyl ether, phenyl glycidyl ether, o-phenylphenyl glycidyl ether, ethylene oxide lauryl alcohol glycidyl ether, ethylene glycol diglycidyl ether, polyethylene glycol diglycidyl ether, propylene glycol diglycidyl ether, polypropylene glycol diglycidyl ether, neopentylene glycol diglycidyl ether, polytetramethylene glycol diglycidyl ether, cyclohexane dimethanol diglycidyl ether, glycerol triglycidyl ether, trimethylolpropane triglycidyl ether and pentaerythritol tetraglycidyl ether. Bisphenol A diglycidyl ether type epoxy resin, bisphenol F diglycidyl ether type epoxy resin and bisphenol S diglycidyl ether type epoxy resin obtained through a condensation reaction between a bisphenol such as 2,2-bis(4-hydroxyphenyl)propane, bis(4-hydroxyphenyl)methane or bis(4-hydroxyphenyl)sulfone and epichlorohydrin are also included in the above examples. Out of these, bisphenol A diglycidyl ether type epoxy resin is preferred.

Examples of the glycidyl ester compound include benzoic acid glycidyl esters, p-toluoylic acid glycidyl esters, cyclohexanecarboxylic acid glycidyl esters, stearic acid glycidyl esters, lauric acid glycidyl esters, palmitic acid glycidyl esters, versatic acid glycidyl esters, oleic acid glycidyl esters, linoleic acid glycidyl esters, linolenic acid glycidyl esters, terephthalic acid diglycidyl esters, isophthalic acid diglycidyl esters, phthalic acid diglycidyl esters, naphthalenedicarboxylic acid diglycidyl esters, methylterephthalic acid glycidyl esters, hexahydrophthalic acid diglycidyl esters, tetrahydrophthalic acid diglycidyl esters, cyclohexanedicarboxylic acid diglycidyl esters, adipic acid diglycidyl esters, succinic acid diglycidyl esters, sebacic acid diglycidyl esters, dodecanedioic acid diglycidyl esters, octadecanedicarboxylic acid diglycidyl esters, trimellic acid triglycidyl esters and pyromellitic acid tetraglycidyl esters. Out of these, benzoic acid glycidyl esters and versatic acid glycidyl esters are preferred.

Examples of the glycidyl amine compound include tetraglycidylamine diphenylmethane, triglycidyl-p-aminophenol, triglycidyl-m-aminophenol, diglycidyl aniline, diglycidyl toluidine, tetraglycidyl metaxylenediamine, diglycidyl tribromoaniline, tetraglycidylbisaminomethyl cyclohexane and triglycidyl isocyanurate.

Examples of the glycidyl imide compound and the glycidyl amide compound include N-glycidyl phthalimide, N-glycidyl-4-methyl phthalimide, N-glycildyl-3-methyl phthalimide, N-glycidyl-4,5-dimethyl phthalimide, N-glycidyl-3,6-dimethyl phthalimide, N-glycidyl-4-ethoxy phthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidylsuccinimide, N-glycidyl hexahydrophthalimide, N-glyclidyl-1,2,3,4-tetrahydrophthalimide, N-glycidyl maleinimide, N-glycidyl-α,β-dimethylsuccinimide, N-glycidyl-α-ethylsuccinimide, N-glycidyl-α-propylsuccinimide, N-glycidyl-α-ethylsuccinimide, N-glycidylbenzamide, N-glycidyl-p-methylbenzamide, N-glycidylnaphthoamide and N-glycidyl stearylamide. Out of these, N-glycidyl phthalimide is particularly preferred.

Examples of the alicyclic epoxy compound include 3,4-epoxycyclohexyl-3,4-cyclohexyl carboxylate, bis(3,4-epoxycyclohexylmethyl)adipate, vinyl cyclohexene diepoxide, N-methyl-4,5-epoxycyclohexane-1,2-dicarboxylic acid imide, N-ethyl-4,5-epoxycyclohexane-1,2-dicarboxylic acid imide, N-phenyl-4,5-epoxycyclohexane-1,2-dicarboxylic acid imide, N-naphthyl-4,5-epoxycyclohexane-1,2-dicarboxylic acid imide and N-tolyl-4,5-epoxycyclohexane-1,2-dicarboxylic acid imide.

Other epoxy compounds include epoxy modified fatty acid glycerides such as epoxylated soybean oil, epoxylated linseed oil and epoxylated whale oil, phenol novolak type epoxy resin and cresol novolak type epoxy resin.

Examples of the oxazoline compound include 2-methoxy-2-oxazoline, 2-ethoxy-2-oxazoline, 2-propyloxy-2-oxazoline, 2-butoxy-2-oxazoline, 2-hexyloxy-2-oxazoline, 2-octyloxy-2-oxazoline, 2-decyloxy-2-oxazoline, 2-dodecyloxy-2-oxazoline, 2-stearyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-benzyloxy-2-oxazoline, 2-cresyloxy-2-oxazoline, 2-o-ethylphenoxy-2-oxazoline, 2-o-propylphenoxy-2-oxazoline, 2-o-phenylphenoxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-butyl-2-oxazoline, 2-pentyl-2-oxazoline, 2-heptyl-2-oxazoline, 2-nonyl-2-oxazoline, 2-decyl-2-oxazoline, 2-tridecyl-2-oxazoline, 2-myristyl-2-oxazoline, 2-oleyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-benzyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline, 2-p-phenylphenyl-2-oxazoline, 2-p-ethylphenyl-2-oxazoline, 2-p-propylphenyl-2-oxazoline, 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4'-methyl-2-oxazoline), 2,2'-m-phenylenebis(4,4'-methyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-oxazoline), 2,2'-9,9'-diphenoxyethanebis(2-oxazoline), 2,2'-cyclohexylenebis(2-oxazoline) and 2,2'-diphenylenebis(4-methyl-2-oxazoline). Polyoxazoline compounds containing the above compound as a monomer unit are also included.

Examples of the oxazine compound include 2-methoxy-5,6-dihydro-4H-1,3-oxazine, 2-ethoxy-5,6-dihydro-4H-1,3-oxazine, 2-propyloxy-5,6-dihydro-4H-1,3-oxazine, 2-butoxy-5,6-dihydro-4H-1,3-oxazine, 2-pentyloxy-5,6-dihydro-4H-1,3-oxazine, 2-hexyloxy-5,6-dihydro-4H-1,3-oxazine, 2-heptyloxy-5,6-dihydro-4H-1,3-oxazine, 2-octyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-cyclohexyloxy-5,6-dihydro-4H-1,3-oxazine, 2-allyloxy-5,6-dihydro-4H-1,3-oxazine, 2-methallyloxy-5,6-dihydro-4H-1,3-oxazine and 2-crotyloxy-5,6-dihydro-4H-1,3-oxazine.

Further, 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylene(5,6-dihydro-4H-1,3-oxazine) and 2,2'-P,P'-diphenylenebis(5,6-dihydro-4H-1,3-oxazine) are also included. Polyoxazine compounds containing the above compound as a monomer unit are further included.

Out of the above oxazoline compounds and the above oxazine compounds, 2,2'-m-phenylenebis(2-oxazoline) and 2,2'-p-phenylenebis(2-oxazoline) are preferred.

The isocyanate compound is selected from aromatic, aliphatic and alicyclic isocyanate compounds and mixtures thereof.

Monoisocyanate compounds include phenyl isocyanate, tolyl isocyanate, dimethylphenyl isocyanate, cyclohexyl isocyanate, butyl isocyanate and naphthyl isocyanate.

Diisocyanates include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, mixture of 2,4-tolylene diisocyanate and 2,6-tolylene diisocyanate, hexamethylene diisocyanate, cyclohexane-4,4'-diisocyanate, xylylene diisocyanate, isophorone diisocyanate, dicyclohexylmethane-4,4'-diisocyanate, methylcyclohexane diisocyanate, tetramethylxylylene diisocyanate and 2,6-diisopropylphenyl-1,4-diisocyanate.

Out of these isocyanate compounds, aromatic isocyanates such as 4,4'-diphenylmethane diisocyanate and phenyl isocyanate are preferred.

One or more of the above compounds may be suitably selected and used as the component J. The terminal carboxyl group or the acidic low molecular weight compound may be capped according to the application purpose of a molded article of the composition of the present invention. Stated more specifically, for the capping of the terminal carboxyl group or the acidic low molecular weight compound, the acid value of the composition is preferably not more than 20 equivalents/$10^6$ g from the viewpoint of hydrolysis resistance, more preferably not more than 10 equivalents/$10^6$ g, particularly preferably not more than 5 equivalents/$10^6$ g. The acid value of the composition can be measured by dissolving the resin composition in a suitable solvent and determining the amount of the acidic proton by titration with an alkali solution whose concentration is known or NMR.

The content of the component J is preferably 0.01 to 10 parts by weight, more preferably 0.03 to 5 parts by weight based on 100 parts by weight of the component A.

When the component J is used in the present invention, a reaction catalyst for the terminal capping agent may be used. The reaction catalyst is a compound which is effective in promoting a reaction between the component J and a polymer terminal or the carboxyl group of an acidic low molecular weight compound, preferably a compound which has capability of promoting the reaction even when a small amount thereof is added. This compound is selected from an alkali (earth) metal compound, tertiary amine, imidazole compound, quaternary ammonium salt, phosphine compound, phosphonium compound, phosphoric acid ester, organic acid and Lewis acid.

Examples of the compound include an alkali metal compound such as sodium hydroxide, potassium hydroxide, lithium hydroxide, cesium hydroxide, sodium hydrogencarbonate, potassium hydrogencarbonate, sodium carbonate, potassium carbonate, lithium carbonate, sodium acetate, potassium acetate, lithium acetate, sodium stearate, potassium stearate, lithium stearate, sodium benzoate, potassium benzoate, lithium benzoate, sodium borohydride, potassium borohydride, lithium borohydride, sodium phenylboride, disodium hydrogenphosphate, dipotassium hydrogenphosphate, dilithium hydrogenphosphate, bisphenol A disodium, bisphenol A dipotassium, bisphanol A dilithium and bisphenol A dicesium. Examples of the alkali earth metal compound include potassium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate. Examples of the tertiary amine include triethylamine, tributylamine, trihexylamine, triamylamine, triethanolamine, dimethylaminoethanol, N,N,N',N'-tetramethyltriethylenediamine, dimethylaniline, dimethylbenzylamine, 2-(dimethylaminomethyl)phenol, pyridine, picoline and 1,8-diazabicyclo[5,4,0]undecene-7. Examples of the imidazole compound include 2-methylimidazole, 2-ethylimidazole, 2-isopropylimidazole, 2-ethyl-4-methylimidazole and 2-methyl-4-phenyl]midazole. Examples of the quaternary ammonium salt include tetramethylammonium hydroxide, tetraethylammonium chloride, tetrabutylammonium bromide, trimethylbenzyl hydroxide, trimethylbenzyl chloride, triethylbenzyl chloride, tripropylbenzyl chloride and N-methylpyridinium chloride. Examples of the phosphine compound include tributyl phosphine, trioctyl phosphine and triphenyl phosphine. Examples of the phosphonium salt include tetramethylphosphonium hydroxide, tetramethylphosphonium chloride, tetrabutylphosphonium chloride, tetraphenylphosphonium hydroxide, tetraphenylphosphonium chloride, tetraphenylphosphonium bromide and trimethylbenzylphosphonium hydroxide. Examples of the phosphoric acid ester include trimethyl phosphate, triethyl phosphate, tributyl phosphate, trioctyl phosphate, tris (butoxyethyl)phosphate, triphenyl phosphate, tricresyl phosphate, trixylyl phosphate, cresyldiphenyl phosphate and octyldiphenyl phosphate. Examples of the organic acid include oxalic acid, p-toluenesulfonic acid, dodecylbenzenesulfonic acid and dinonylnaphthalenedisulfonic acid. Examples of the Lewis acid include boron trifluoride, ammonium trichloride, titanium tetrachloride and tin tetrachloride.

They may be used alone or in combination of two or more. Alkali metal compounds, alkali earth metal compounds and phosphoric acid esters are preferred, and acid salts of an alkali or alkali earth metal are more preferred. Sodium stearate, potassium stearate, calcium stearate, magnesium stearate, sodium benzoate, sodium acetate, potassium acetate, calcium acetate and magnesium acetate are particularly preferred.

The amount of the reaction catalyst is preferably 0.001 to 1 part by weight, more preferably 0.005 to 0.5 part by weight, much more preferably 0.01 to 0.1 part by weight based on 100 parts by weight of the component A.

<Plasticizer: Component K>

The composition of the present invention may comprise a plasticizer (component K). The plasticizer (component K) is selected from a polyester-based plasticizer, glycerin-based plasticizer, polycarboxylic acid ester-based plasticizer, phosphoric acid ester-based plasticizer, polyalkylene glycol-based plasticizer and epoxy-based plasticizer.

Examples of the polyester-based plasticizer include polyesters comprising adipic acid, sebacic acid, terephthalic acid, isophthalic acid, naphthalenedicarboxylic acid or diphenyldicarboxylic acid as an acid component and ethylene glycol, propylene glycol, 1,3-butanediol, 1,4-butanediol, 1,6-hexanediol or diethylene glycol as a diol component, and polyesters comprising hydroxycarboxylic acid such as polycaprolactone. The terminals of these polyesters may be capped by a monofunctional carboxylic acid or a monofunctional alcohol.

Examples of the glycerin-based plasticizer include glycerin monostearate, glycerin distearate, glycerin monoacetomonolaurate, glycerin monoacetomonostearate, glycerin diacetomonooleate and glycerin monoacetomonomontanate.

Examples of the polycarboxylic acid-based plasticizer include phthalic acid esters such as dimethyl phthalate, diethyl phthalate, dibutyl phthalate, diheptyl phthalate, dibenzyl phthalate and butylbenzyl phthalate, trimellitic acid esters such as tributyl trimellitate, trioctyl trimellitate and trihexyl trimellitate, adipic acid esters such as isodecyl adipate and n-decyl-n-octyl adipate, citric acid esters such as tributyl acetylcitrate, azelaic acid esters such as bis(2-ethylhexyl)azelate, and sebacic acid esters such as dibutyl sebacate and bis(2-ethylhexyl)sebacate.

Examples of the phosphoric acid ester-based plasticizer include tributyl phosphate, tris(2-ethylhexyl) phosphate, trioctyl phosphate, triphenyl phosphate, tricresyl phosphate and diphenyl-2-ethylhexyl phosphate.

Examples of the polyalkylene glycol-based plasticizer include polyalkylene glycols such as polyethylene glycol, polypropylene glycol, polytetramethylene glycol, poly(ethylene oxide propylene oxide) block or random copolymer, addition polymer of ethylene oxide with a bisphenol, and addition polymer of tetrahydrofuran with a bisphenol, and terminal capping agent compounds such as terminal epoxy modified compounds, terminal ester modified compounds and terminal ether modified compounds of these polyalkylene glycols.

Examples of the epoxy-based plasticizer include epoxy triglyceride comprising alkyl epoxystearate and soybean oil, and epoxy resin obtained from bisphenol A and epichlorohydrin.

Other plasticizers include benzoic acid esters of an aliphatic polyol such as neopentyl glycol dibenzoate, diethylene glycol dibenzoate and triethylene glycol-bis(2-ethylbutyrate), fatty acid amides such as stearic acid amide, fatty acid esters such as butyl oleate, oxyacid esters such as methyl acetylricinoleate and butyl acetylricinoleate, pentaerythritol, sorbitols, polyacrylic acid esters, silicone oil and paraffins.

The component K is preferably at least one selected from polyester-based plasticizers and polyalkylene-based plasticizers. The above components K may be used alone or in combination of two or more. The content of the component K is preferably 0.01 to 30 parts by weight, more preferably 0.05 to 20 parts by weight, much more preferably 0.1 to 10 parts by weight based on 100 parts by weight of the component A. In the present invention, a crystal nucleating agent and a plasticizer may be used independently but preferably used in combination.

<Impact Resistance Accelerator: Component L>

The composition of the present invention may comprise an impact resistance accelerator (component L). The impact resistance accelerator (component L) is not particularly limited if it can be used to improve the impact resistance of a thermoplastic resin. For example, at least one selected from the following impact resistance accelerators may be used.

Examples of the impact resistance accelerator include an ethylene-propylene copolymer, ethylene-propylene-nonconjugated diene copolymer, ethylene-butene-1 copolymer, acrylic rubber, ethylene-acrylic acid copolymer and alkali metal salt thereof (so-called "ionomer"), ethylene-glycidyl (meth)acrylate copolymer, ethylene-acrylate copolymer (such as ethylene-ethyl acrylate copolymer, ethylene-butyl acrylate copolymer), modified ethylene-propylene copolymer, diene rubber (such as polybutadiene, polyisoprene, polychloroprene), diene-vinyl copolymer (such as styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, polybutadiene-styrene graft copolymer, butadiene-acrylonitrile copolymer), polyisobutylene, copolymer of isobutylene and butadiene or isoprene, natural rubber, Thiokol rubber, polysulfide rubber, polyurethane rubber, polyether rubber and epichlorohydrin rubber.

Further, impact resistance accelerators having different degrees of crosslinking, impact resistance accelerators having various micro-structures such as cis-structure and trans-structure, and core-shell type multi-layer structure polymers consisting of a core layer and at least one shell layer covering the core layer, adjacent layers being made of different polymers, may also be used.

The (co)polymers enumerated above may be random copolymers, block copolymers or block copolymers and may be used as the impact resistance accelerator of the present invention.

To produce these (co)polymers, a monomer such as another olefin, diene, aromatic vinyl compound, (meth) acrylic acid or (meth)acrylic acid ester may be copoymerized.

Out of these impact resistance accelerators, polymers containing an acryl unit and copolymers containing a unit having an acid anhydride and/or a glycidyl group are preferred. Preferred examples of the (meth)acryl unit include methyl methacrylate unit, ethyl acrylate unit, methyl acrylate unit and butyl acrylate unit. Preferred examples of the unit having an acid anhydride group or a glycidyl group include maleic anhydride unit and glycidyl methacrylate unit.

The impact resistance accelerator is preferably a multi-layer structure polymer so-called "core-shell type" composed of a core layer and at least one shell layer covering the core layer, adjacent layers being made of different polymers, more preferably a multi-layer structure polymer containing a methyl (meth)acrylate unit in the shell layer.

The multi-layer structure polymer preferably contains a (meth)acryl unit and a unit having an acid anhydride group and/or a glycidyl group. Preferred examples of the (meth) acryl unit include methyl methacrylate unit, ethyl acrylate unit and methyl acrylate unit, and preferred examples of the unit having an acid anhydride group or a glycidyl group include maleic anhydride unit and glycidyl methacrylate unit.

A multi-layer structure containing a (meth)acryl methyl unit, at least one selected from a maleic anhydride unit and a glycidyl methacrylate unit in the shell layer and at least one selected from a butyl acrylate unit, ethylhexyl acrylate unit, styrene unit and butadiene unit in the core layer may be particularly preferably used. The glass transition temperature of the impact resistance accelerator is preferably −20° C. or lower, more preferably −30° C. or lower.

The content of the component L is preferably 1 to 30 parts by weight, more preferably 5 to 20 parts by weight, much more preferably 10 to 20 parts by weight based on 100 parts by weight of the component A.

<Others>

In the present invention, a thermosetting resin such as phenol resin, melamine resin, thermosetting polyester resin, silicone resin or epoxy resin may be contained in limits not prejudicial to the object of the present invention. In the present invention, a flame retardant such as bromine-based, phosphorus-based, silicone-based or antimony compound may be contained in limits not prejudicial to the object of the present invention. A colorant including an organic or inorganic dye or pigment, exemplified by oxides such as titanium dioxide, hydroxides such as alumina white, sulfides such as zinc sulfide, ferrocyanides such as iron blue, chromates such as zinc chromate, sulfates such as barium sulfate, carbonates such as calcium carbonate, silicates such as ultramarine blue, phosphates such as manganese violet, carbons such as carbon black and metal colorants such as bronze powder and aluminum powder, may be contained. A fused polycyclic colorant exemplified by nitroso-based compounds such as Naphthol Green B, nitro-based compounds such as Naphthol Yellow-S, azo-based compounds such as Naphthol Red and Chromophthal Yellow, phthalocyanine-based compounds such as Phthalocyanine Blue and Fast Sky Blue, and Indanthrene Blue, and a slidability improving agent such as graphite or fluororesin may be contained. These additives may be used alone or in combination of two or more.

<Production and Physical Properties of Composition>

The composition of the present invention can be prepared by mixing together the above components. A tumbler, twin-cylinder mixer, super mixer, Nauter mixer, Banbury mixer, kneading roll, or single-screw or double-screw extruder may be used to mix them together. The obtained composition can be molded directly or after it is formed into a pellet by means of a melt extruder. The pellet preferably has a shape that is suitable for molding by a molding method. Stated more specifically, the pellet preferably has a length of 1 to 7 mm, a long diameter of 3 to 5 mm and a short diameter of 1 to 4 mm. It is preferred that there should be no nonuniformity in shape.

The weight average molecular weight of the composition of the present invention is preferably 80,000 to 500,000, more preferably 100,000 to 500,000, much more preferably 130,000 to 400,000.

The lactide content of the composition of the present invention is preferably 0 to 1,000 ppm, more preferably 0 to 700 ppm, much more preferably 0 to 500 ppm.

The molecular weight dispersion (Mw/Mn) of the composition of the present invention is preferably 1.5 to 2.4, more preferably 1.6 to 2.4, much more preferably 1.6 to 2.3.

The wet heat stability of the composition of the present invention is preferably not less than 80%, more preferably 85 to 99%, much more preferably 90 to 98%.

The melt stability of the composition of the present invention is preferably not less than 80%, more preferably 85 to 99%, much more preferably 90 to 98%. The melt stability is a stability parameter when the resin is molten and evaluated based on the retention of reduced viscosity after the composition is maintained at 260° C. for 10 minutes. When the melt stability is not less than 80%, ordinary injection molding and extrusion molding can be carried out by setting suitable conditions.

Therefore, it is preferred that the composition of the present invention should have a wet heat stability of not less than 80% and a melt stability of not less than 80%.

The composition of the present invention has a relative crystallinity (RC) of preferably not less than 80%, more preferably not less than 90%. The relative crystallinity (RC) is expressed by the following equation.

$$RC(\%) = \{(\Delta Hm1 - \Delta Hcc1)/\Delta Hm1\} \times 100$$

($\Delta Hm1$ is crystal melting heat and $\Delta Hcc1$ is crystallization enthalpy.)

The composition of the present invention has a stereo crystal rate (S) of preferably not less than 80%, more preferably not less than 90%.

The stereo crystal rate (S) is expressed by the following equation.

$$S(\%) = [\Delta Hmsc/(\Delta Hmh + \Delta Hmsc)] \times 100$$

($\Delta Hmh$ is the crystal melting heat of a crystal melting peak at a temperature lower than 190° C. observed in the DSC measurement. $\Delta Hmsc$ is the crystal melting heat of a crystal melting peak at a temperature of 190° C. or higher observed in the DSC measurement.)

[Production of Stereocomplex Polylactic Acid]

The stereocomplex polylactic acid is a polylactic acid having a high melting point and containing a stereocomplex crystal. It is known that the stereocomplex polylactic acid can be produced by mixing together poly(L-lactic acid) and poly(D-lactic acid) in a solution or molten state. The composition of the present invention may be used as a raw material for the stereocomplex polylactic acid. That is, the present invention includes a method of using the composition of the present invention for the production of the stereocomplex polylactic acid.

The present invention also includes a method of producing stereocomplex polylactic acid by mixing together poly(L-lactic acid) and poly(D-lactic acid), wherein the composition of the present invention is used as at least one of poly(L-lactic acid) and poly(D-lactic acid).

The poly(L-lactic acid) is a resin comprising an L-lactic acid unit as the main component and comprises preferably not less than 90 mol %, more preferably not less than 95 mol % of the L-lactic acid unit. Preferably, the poly(L-lactic acid) comprises 90 to 100 mol % of an L-lactic acid unit and 0 to 10 mol % of a D-lactic acid unit.

The poly(D-lactic acid) is a resin comprising a D-lactic acid unit as the main component and comprises preferably not less than 90 mol %, more preferably not less than 95 mol % of the D-lactic acid unit. Preferably, the poly(D-lactic acid) comprises 90 to 100 mol % of a D-lactic acid unit and 0 to 10 mol % of an L-lactic acid unit.

The method includes the following aspects: (1) mixing together the composition of the present invention comprising poly(L-lactic acid) as the component A and poly(D-lactic acid), (2) mixing together the composition of the present invention comprising poly(D-lactic acid) as the component A and poly(L-lactic acid), and (3) mixing together the composition of the present invention comprising poly(L-lactic acid) as the component A and the composition of the present invention comprising poly(D-lactic acid) as the component A.

Mixing may be either solution mixing in which the resin is dissolved in a solvent or melt mixing in which the resin is molten. The weight ratio of poly(L-lactic acid) to poly(D-lactic acid) is preferably 60/40, more preferably 55/45.

[Molded Article]

The composition of the present invention can be formed into a molded article by injection molding or extrusion molding. At the time of injection molding, the mold temperature is preferably 30° C. or higher, more preferably 60° C. or higher, much more preferably 70° C. or higher to improve the crystallization and molding cycle of a molded article. However, the mold temperature is preferably 140° C. or lower, more preferably 120° C. or lower, much more preferably 110° C. or lower to prevent the deformation of a molded article.

Molded articles of the composition of the present invention include injection molded articles, extrusion molded articles, vacuum and pressure molded articles and blow molded articles, and films, sheets, sheet nonwoven fabrics, fibers, cloth, composite materials with other materials, agricultural materials, fishing materials, civil engineering and construction materials, stationery, medical supplies and other molded articles can be obtained by conventionally known methods.

These molded articles can be used for various purposes such as housings, electric and electronic parts for toothed wheels, gears, construction members, civil engineering members, agricultural materials, auto parts (interior and exterior parts) and parts for daily use.

More specifically, they can be used in notebook personal computer housings and interior parts thereof, CRT display housings and interior parts thereof, printer housings and interior parts thereof, portable terminal housings such as mobile phones, mobile personal computers and handheld mobiles and interior parts thereof, recording medium drive housings such as CD, DVD, PD and FDD and interior parts thereof, copier housings and interior parts thereof, facsimile housings and interior parts thereof, and electric and electronic parts typified by parabolic antennas.

Further, they can be used in home and office equipment parts typified by VTR housings and interior parts thereof, TV housings and interior parts thereof, irons, hair driers, rice cooker parts, microwave oven parts, audio equipment parts such as acoustic parts, audio laser disks (registered trademark), and compact disks, lighting parts, refrigerator parts, air conditioner parts, typewriter parts and word-processor parts.

They can also be used in housings for electronic musical instruments, home game machines and portable game machines and interior parts thereof, electric and electronic parts such as gears, cases, sensors, LED lamps, connectors, sockets, resistors, relay cases, motor cases, switches, capacitors, variable condenser cases, optical pick-ups, oscillators, terminal assemblies, transformers, plugs, printed circuit boards, tuners, speaker microphones, head phones, small-sized motors, magnetic head bases, power modules, semiconductors, liquid crystals, FDD carriages, FDD chassis, motor brush holders, transformer members and coil bobbins, construction members such as metal-framed glass sliding door wheels, blind curtain parts, pipe joints, curtain liners, blind parts, gas meter parts, city water meter parts, water heater parts, roof panels, adiabatic walls, adjusters, plastic bundling tools, ceiling hanging tools, stairways, doors and floors, fishery-related members such as fish lines, fish nets, seaweed farming nets and bait bags, civil engineering-related parts such as vegetation nets, vegetation mats, grass protection bags, grass protection nets, curing sheets, slope protection sheets, fly ash holding sheets, drain sheets, water-retaining sheets, sludge and slime dehydrating bags and concrete frames, auto under hood parts such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotary sensors, acceleration sensors, distributor caps, coil bases, ABS actuator cases, tops and bottoms for radiator tanks, cleaning fans, fan shrouds, engine covers, cylinder head covers, oil caps, oil pans, oil filters, fuel caps, fuel strainers, distributor caps, paper canister housings, air cleaner housings, timing belt covers, brake booster parts, cases, tubes, tanks, hoses, clips, valves and pipes, car interior parts such as torque control levers, safety belt parts, register blades, washer levers, window regulator handles, wind regulator handle knobs, passing light levers, sun visor brackets and motor housings, car exterior parts such as roof rails, fenders, garnishes, bumpers, door mirror stays, spoilers, hood louvers, wheel covers, wheel caps, grill apron cover frames, lamp reflectors, lamp bezels and door handles, car connectors such as wire harnesses, SMJ connectors, PCB connectors and door grommet connectors, mechanical parts such as gears, screws, springs, bearings, levers, key systems, cams, ratchets, rollers, water supply parts, toy parts, fans, tezusu, pipes, cleaning jigs, motor parts, microscopes, binoculars, cameras and timepieces, agricultural members such as multi-films, tunnel films, bird protection sheets, curing and protection nonwoven fabrics, seedling raising pots, planting stakes, seed tapes, germination sheets, house lining sheets, agricultural vinyl stoppers, delayed release fertilizers, root protection sheets, garden nets, flyscreens, young tree nets, print laminates, fertilizer bags, sandbags, varmint prevention nets, attractant cords and windbreak nets, sanitary goods such as paper diapers, sanitary good package materials, cotton-tipped swabs, hand towels and toilet seat cleaners, medical supplies such as medical nonwoven fabrics (stitch reinforcement materials, synetia prevention films, artificial organ repair materials), wound dressings, wound tape bandages, plaster base fabrics, surgical suture threads, fracture reinforcing materials and medical films, package films for calendars, stationery, apparel and food, vessels and artillery such as trays, blisters, knives, forks, spoons, plastic cans, pouches, containers, tanks and baskets, containers and packages such as hot fill containers, microwave oven cooking containers, cosmetic containers, wraps, foamed cushioning materials, paper laminates, shampoo bottles, drink bottles, cups, candy packages, shrink label, cover materials, window cleaners, envelops, fruit baskets, hand tearable tapes, easy peel packages, egg cases, HDD packages, compost bags, recording medium packages, shopping bags and wrapping films for electric and electronic parts, apparel such as natural fiber composite polo shirts, T shirts, under wears, uniforms, sweaters, socks and ties, interior goods such as curtains, upholstery fabrics, carpets, tablecloth, ticking, wallpapers and wrapping cloth, carrier tapes, print laminates, films for photosensitive screen printing, release films, porous films, container bags, credit cards, cash cards, ID cards, IC cards, hot melt binders for paper, leather and nonwoven fabrics, binders for magnetic materials, zinc sulfide and electrode materials, optical devices, conductive embossed tapes, IC trays, golf tees, trash bags, shopping bags, nets, tooth brushes, stationery, draining nets, body towels, hand towels, tea packages, drain filters, clear files, coating agents, adhesives, bags, chairs, tables, cooler boxes, drag rakes, hose reels, planters, hose nozzles, dining tables, desk surfaces, furniture panels, kitchen cabinets, pen caps and gas lighters.

EXAMPLES

The following examples are provided for the purpose of further illustrating the present invention but are in no way to be taken as limiting.
1. Values in the examples were obtained by the following methods.
(1) Weight Average Molecular Weight (Mw) and Number Average Molecular Weight (Mn):
They were obtained by gel permeation chromatography (GPC) as compared with a polystyrene standard sample. GPC measurement instruments are given below.
Detector: RID-6A differential refractometer of Shimadzu Corporation
Pump: LC-9A of Shimadzu Corporation
Column: TSKgelG3000HXL, TSKgelG4000HXL, TSKgelG5000HXL and TSKguardcokumnHXL-L of Tosoh Corporation were connected in series.
A chloroform eluant was used and let flow at a column temperature of 40° C. and a flow rate of 1.0 ml/min, and 10 μl of a sample having a concentration of 1 mg/ml (1% hexafluoroisopropanol containing chloroform) was injected.
(2) Weight Average Molecular Weight Retention (%)
The molecular weight retention of a polylactic acid homopolymer composition was obtained by dividing the weight average molecular weight ($Mw^C$) of the composition by the weight average molecular weight)($Mw^0$) of the starting polylactic acid and multiplying the obtained product by 100 ($Mw^C/Mw^0 \times 100$). In the stereocomplex polylactic acid, a value obtained by averaging the weight average molecular weights of poly(L-lactic acid) and poly(D-lactic acid) by the weight of the stereocomplex polylactic acid was used as the weight average molecular weight of the starting polylactic acid to obtain the molecular weight retention.
(3) Melt Stability (%)
The retention of the reduced viscosity ($\eta_{sp}/c$) of the sample after it was kept at 260° C. for 10 minutes in a nitrogen atmosphere was obtained from the following expression as melt stability.

$$V^1/V^0 \times 100$$

($V^0$ is the initial reduced viscosity, and $V^1$ is the reduced viscosity after the sample is kept at 260° C. for 10 minutes.)
(4) Wet Heat Stability (%)
The sample was kept at 80° C. and 90% RH for 11 hours to obtain the retention (%) of its reduced viscosity ($\eta_{sp}/c$) from the following expression as wet heat stability.

$$V^2/V^0 \times 100$$

($V^0$ is the initial reduced viscosity, and $V^2$ is the reduced viscosity after the sample is kept at 80° C. and 90% RH for 11 hours.)
(5) Reduced Viscosity ($\eta_{sp}/c$)
1.2 mg of the sample was dissolved in 100 ml of a mixed solvent of tetrachloroethane and phenol (weight ratio of 6/4) to measure its reduced viscosity at 35° C. by using an Ubbellohde viscometer.

(6) Crystallization Start Temperature (Tcc), Crystallization Enthalpy (ΔHc), Crystal Melting Heat (ΔHm)

The DCS7 of Perkin Elmer Co., Ltd. was used as a differential scanning calorimeter (DSC). 10 mg of the sample was heated from 30° C. to 250° C. at a temperature elevation rate of 20° C./min in a nitrogen atmosphere in the $1^{st}$ run to measure its crystallization temperature (Tcc), crystallization enthalpy (ΔHcc1) and crystal melting heat (ΔHm1) so as to obtain its relative crystallinity from the following equation.

Relative crystallinity={(ΔHm1−ΔHcc1)/ΔHm1}×100

After the sample was kept at 250° C. for 5 minutes, it was cooled from 250° C. to 30° C. at a temperature reduction rate of 5° C./min to measure its crystallization start temperature (Tcc11), crystallization peak temperature (TCC12) and crystallization end temperature (Tcc13).

The stereo crystal rate (S) of a pellet sample of the stereocomplex polylactic acid was obtained from the melting heat (ΔHmh) of the homo-phase crystal of polylactic acid which was seen at a temperature lower than 190° C. and the melting heat (ΔHmsc) of the complex-phase crystal which was seen at a temperature of 190° C. or higher when measured under the above conditions based on the following equation. Stereo crystal rate (S)=[ΔHmsc/(ΔHmh+ΔHmsc)]×100

(7) Tensile Strength and Appearance of Molded Piece

The tensile strength of a molded piece was measured by conducting a tensile test in accordance with the ASTM D638. The appearance of the molded piece was evaluated based on the following criteria.

◎: no deformation in thickness direction and no deformation by a notch pin.
○: no deformation in thickness direction and slight deformation by a notch pin.
Δ: slight deformation in thickness direction and a dent formed by a notch pin.
X: deformation in thickness direction and deformation by a notch pin.

2. Raw materials used in Examples are given below.
(1) Polylactic Acid (A)
A-1: L-polylactic acid having a weight average molecular weight of 160,000, "Reicia H100J", manufactured by Mitsui Chemicals, Inc.
A-2: L-polylactic acid having a weight average molecular weight of 180,000, "Lacty", manufactured by Shimadzu Corporation
A-3: L-polylactic acid having a weight average molecular weight of 156,000 and a molecular weight dispersion of 1.8 obtained in Synthesis Example 1
A-4: D-polylactic acid having a weight average molecular weight of 155,000 and a molecular weight dispersion of 1.7 obtained in Synthesis Example 2

Synthesis Example 1

Synthesis of L-polylactic acid by Melt Ring-opening Polymerization of L-lactide After the inside of a vertical stirring tank (40 liters) equipped with a full-zone blade, vacuum pipe, nitrogen gas pipe, catalyst, L-lactide solution introduction pipe and alcohol initiator introduction pipe was substituted by nitrogen, 30 kg of L-lactide having an optical purity of 99%, 0.69 g (0.023 mol/kg-LD) of stearyl alcohol and 6.14 g ($5.05 \times 10^{-4}$ mol/1 kg-LD) of tin octylate were charged into the tank and heated at 150° C. under a nitrogen pressure of 106.4 kPa. When the contents were dissolved, stirring was started and the inside temperature was further raised to 190° C. Since a reaction starts when the inside temperature exceeds 180° C., cooling was started to maintain the inside temperature at 185 to 190° C. to continue the reaction for 2 hours.

Then, the inside pressure was increased from 2 atm. to 5 atm. and the contents were supplied into a stirring tank equipped with a max blending blade. After a reaction was carried out at a nitrogen pressure of 106.4 kPa and an inside temperature of 200 to 210° C. for 2.5 hours under agitation, stirring was stopped and the inside pressure was reduced to 13.3 kPa to adjust the amount of lactide for 20 minutes. Thereafter, the inside pressure was increased to 2 to 3 atm. in terms of nitrogen pressure, a prepolymer was extruded into a chip cutter to obtain a pellet of the prepolymer having a weight average molecular weight of 65,000 and a molecular weight dispersion of 1.5.

After the batch reaction was repeated 3 times, the prepolymer was supplied into a polymerizes having a capacity of 60 liters and an anxial basket type stirring blade at a rate of 16 kg/hr, a catalyst and L-lactide was supplied at a rate of 16 kg/hr, and a tin octylate catalyst was supplied at a rate of $5.05 \times 10^{-4}$ mol/1 kg L-LD based on 1 kg of L-lactide to carry out polymerization at 200 to 210° C. for a residence time of 2 hours, the obtained reaction product was supplied into a second polymerizer having an anaxial basket type stirring blade, a phosphoric acid deactivator was added from an inlet port in an amount of 1.05 moles based on 1 mole of the catalyst to carry out a lactide reduction treatment at an inside pressure of 1.33 kPa for a residence time of 0.5 hour, and the resulting product was transferred to a chip cutter with a metering pump to obtain a chip. Poly(L-lactic acid) which was subjected to the lactide reduction treatment had a weight average molecular weight of 156,000, a molecular weight dispersion of 1.8 and a lactide content of 0.005 wt %.

Synthesis Example 2

Synthesis of D-polylactic acid by Melt Ring-opening Polymerization of D-lactide The operation of Synthesis Example 1 was repeated except that D-lactide having an optical purity of 99% was used to synthesize poly(D-lactic acid) having a weight average molecular weight of 155,000, a molecular weight dispersion of 1.7 and a lactide content of 0.005 wt %.

(2) Carbodiimide (B)
B-1: Carbodilite LA-1 having an isocyanate group content of 1.5 wt % and a carbodiimide equivalent of 247, manufactured by Nisshinbo Industries, Inc.
B-2: Carbodilite HMV-8CA having a carbodiimide equivalent of 293, manufactured by Nisshinbo Industries, Inc.
B-3: polycarbodiimide having an isocyanate group content of 1.5 wt % and a carbodiimide equivalent of 214, obtained in Synthesis Example 3
B-4: polycarbodiimide having an isocyanate group content of 1.7 wt % and a carbodiimide equivalent of 244, obtained in Synthesis Example 4

Synthesis Example 3

Synthesis of Polycarbodiimide

The following polycarbodiimide was synthesized in accordance with the synthesis example of a carbodiimide compound described in JP-A 11-80522. That is, 590 parts by weight of 4,4'-dicyclohexylmethane diisocyanate, 62.6 parts by weight of cyclohexyl isocyanate and 6.12 parts by weight of 3-methyl-1-phenyl-2-phosphorene-1-oxide as a carbodimidation catalyst were reacted with one another at 180° C. for 48 hours to obtain poly(4,4'-dicyclohexylcarbodiimide) having a polymerization degree of 10.

Synthesis Example 4

549 parts by weight of tetramethylbisphenylene diisocyanate, 49.5 parts by weight of n-butyl isocyanate and 5.99 parts by weight of 3-methyl-1-phenyl-2-phosphorene-1-oxide as a carbodiimidation catalyst were reacted with one another at 180° C. for 48 hours to obtain poly(tetramethylenecarbodiimide) having a polymerization degree of 10.

(3) Phosphoric Acid Ester Metal Salt (C):
C-1: NA-10 of ADEKA CORPORATION
C-2: NA-11 of ADEKA CORPORATION
C-3: NA-21 of ADEKA CORPORATION (4) Thermoplastic Resin (D)
D-1: polybutylene (terephthalate/adipate) resin; Ecoflex of BASF AG.
D-2: polybutylene (succinate/adipate); Bionere 3001 of Showa Kobunshi Co., Ltd.
D-3: polybutylene succinate carbonate; Youpeck of Mitsubishi Gas Chemical Co., Ltd.
D-4: bisphenol A polycarbonate; L1250 of Teijin Chemicals, Ltd.
D-5: polyamide; Amilan CM4000 of Toray Industries, Inc.
D-6: butadiene-alkyl acrylate-alkyl methacrylate copolymer; EXL-2602 of Kureha Chemical Industry Co., Ltd.
D-7: core-shell type elastomer; Metabrene 52001 of Mitsubishi Rayon Co., Ltd.

(5) Stabilizer (E)
E-1: n-octadecyl-3-(3',5'-di-t-butyl-4'-hydroxyphenyl)-propionate; Irganox 1076 of Chiba-Geigy Corp.
E-2: 2-(3,5-di-t-butyl-2-hydroxyphenyl)benzotriazole; Tinuvin 320 of Chiba-Geigy Corp.
E-3: tris(2,4-di-t-butylphenyl)phosphite; Irgafos 168 of Chiba-Geigy Corp.

(6) Crystallization Accelerator (F)
F-1: talc; Micro Ace P6 particulate talc of Nippon Talc Co., Ltd. (average particle diameter of 4 μm)
F-2: calcium metasilicate, manufactured by Alfa Aesar Co., Ltd.
F-3: sodium perborate, manufactured by Wako Pure Chemical Industries, Ltd. (average particle diameter of 2 μm)

(7) Filler (G)
G-1: talc; Micro Ace P6 particulate talc of Nippon Talc Co., Ltd. (average particle diameter of 4 μl)
G-2: glass fiber; ECS-03T-511 chopped strand bundled by urethane of Nippon Electric Glass Co., Ltd.
G-3: wollastonite; Wickrol 10 of Partek Co., Ltd.
G-4: kaolin; Translink 555 of Engelhard Co., Ltd.

(8) Release Agent (H)
H-1: montanic acid partially saponified ester; Ricowax OP of Clariant International Ltd.
H-2: ethylenebis stearic acid amide; Slipacks E of Nippon Kasei Co., Ltd.

(9) Carboxyl Group Reactive Terminal Capping Agent (J)
J-1: bisphenol A diglycidyl ether; Epicoat 828 of Japan Epoxy Resin Co., Ltd.

Examples 1 to 9, Comparative Examples 1 to 4

(Composition)

The types and amounts based on 100 parts by weight of polylactic acid (A) of a carbodiimide compound (B), a phosphoric acid ester metal salt (C) and other additives shown in Table 1 were uniformly mixed together by means of a tumbler, and the resulting mixture was pelletized by a double-screw extruder having a 30 mm-diameter vent (KTX-30 of Kobe Steel, Ltd.) at a cylinder temperature of 190° C. while deaeration was carried out at a vacuum degree of 10 mmHg. The melt stability, wet heat stability and molecular weight retention of the obtained pellet were measured.

(Molded Piece)

The obtained pellet was dried at 110° C. for 5 hours and molded at a cylinder temperature of 190° C. and a mold temperature of 100° C. by using an injection molding machine (SG150U of Sumitomo Heavy Industries, Ltd.) to obtain a molded piece having a thickness of 3 mm for ASTM measurement. At this point, the shortest time during which a molded piece was obtained without deformation was taken as molding cycle. The tensile strength, appearance, crystallization start temperature (Tcc), crystallization enthalpy (ΔHc) and crystal melting heat (ΔHm) of the obtained molded piece were measured by DSC. The results are shown in Table 1. As shown in Table 1, the composition of the present invention is excellent in wet heat stability, crystallinity, molecular weight retention and moldability.

TABLE 1

|  |  | C.Ex. 1 | C.Ex. 2 | C.Ex. 3 | C.Ex. 4 | Ex. 1 | Ex. 2 | Ex. 3 |
|---|---|---|---|---|---|---|---|---|
| Polylactic acid (A) | Type | A-1 | A-2 | A-3 | A-3 | A-3 | A-4 | A-4 |
|  | pbw | 100 | 100 | 100 | 100 | 100 | 100 | 100 |
| Weight average molecular weights of raw material |  | 160,000 | 180,000 | 156,000 | 156,000 | 156,000 | 155,000 | 155,000 |
| Carbodiimide compound (B) | Type | — | B-1 | — | — | B-1 | B-1 | B-1 |
|  | pbw | — | 1 | — | — | 0.5 | 0.5 | 2 |
| Phosphoric acid ester metal salt (C) | Type | — | — | C-1 | C-1 | C-1 | C-1 | C-1 |
|  | pbw | — | — | 0.5 | 0.5 | 0.5 | 0.5 | 0.5 |
| Thermoplastic resin (D) | Type | — | — | — | — | — | — | — |
|  | pbw | — | — | — | — | — | — | — |
| Stabilizer (E) | Type | — | — | — | — | — | — | — |
|  | pbw | — | — | — | — | — | — | — |
| Crystallization accelerator (F) | Type | — | — | — | F-1 | — | — | — |
|  | pbw | — | — | — | 1 | — | — | — |
| Filler (G) | Type | — | — | — | — | — | — | — |
|  | pbw | — | — | — | — | — | — | — |
| Release agent (H) | Type | — | — | — | — | — | — | — |
|  | pbw | — | — | — | — | — | — | — |
| Weight average molecular weight | % | 94 | 98 | 75 | 73 | 86.5 | 86.5 | 90.3 |

TABLE 1-continued

| | | | | | | | | |
|---|---|---|---|---|---|---|---|---|
| retention of composition | | | | | | | | |
| Wet heat stability | % | 70 | 85 | 65 | 64 | 86 | 85 | 95 |
| Melt stability | % | 91 | 88 | 87 | 86 | 89 | 89 | 88 |
| Relative crystallinity | % | 22 | 23 | 89 | 96 | 95 | 94 | 94 |
| Molding cycle | sec | Note 1 | Note 1 | 80 | 75 | 80 | 80 | 80 |
| Appearance of molded piece | visual check | X | X | Δ | ○ | ⊙ | ⊙ | ⊙ |
| Tensile strength | MPa | Note 1 | Note 1 | 54 | 54 | 61 | 61 | 64 |
| Color | | Slightly colored | Slightly colored | Slightly colored | Slightly colored | Slightly colored | Slightly colored | Slightly colored |
| Stereo crystal rate (S) | % | — | — | 100 | 100 | 100 | 100 | 100 |

| | | Ex. 4 | Ex. 5 | Ex. 6 | Ex. 7 | Ex. 8 | Ex. 9 |
|---|---|---|---|---|---|---|---|
| Polylactic acid (A) | Type | A-1 | A-3 | A-3 | A-3 | A-3 | A-3 |
| | pbw | 100 | 100 | 100 | 100 | 100 | 100 |
| Weight average molecular weights of raw material | | 160,000 | 156,000 | 156,000 | 156,000 | 156,000 | 156,000 |
| Carbodiimide compound (B) | Type | B-1 | B-2 | B-3 | B-4 | B-1 | B-1 |
| | pbw | 3 | 1 | 1 | 1 | 1 | 1 |
| Phosphoric acid ester metal salt (C) | Type | C-1 | C-2 | C-3 | C-1 | C-1 | C-1 |
| | pbw | 1 | 0.5 | 0.5 | 0.5 | 0.5 | 0.5 |
| Thermoplastic resin (D) | Type | — | — | — | — | — | — |
| | pbw | — | — | — | — | — | — |
| Stabilizer (E) | Type | — | — | — | — | — | — |
| | pbw | — | — | — | — | — | — |
| Crystallization accelerator (F) | Type | — | — | — | — | — | — |
| | pbw | — | — | — | — | — | — |
| Filler (G) | Type | — | — | — | — | — | G-1 |
| | pbw | — | — | — | — | — | 10 |
| Release agent (H) | Type | — | — | — | — | — | — |
| | pbw | — | — | — | — | — | — |
| Weight average molecular weight retention of composition | % | 90 | 90.3 | 90.3 | 90.3 | 90.0 | 90.0 |
| Wet heat stability | % | 95 | 91 | 90 | 92 | 91 | 90 |
| Melt stability | % | 84 | 88 | 89 | 87 | 86 | 86 |
| Relative crystallinity | % | 98 | 95 | 93 | 94 | 94 | 99 |
| Molding cycle | sec | 80 | 80 | 80 | 80 | 75 | 70 |
| Appearance of molded piece | Visual check | ⊙ | ⊙ | ⊙ | ⊙ | ⊙ | ⊙ |
| Tensile strength | MPa | 64 | 61 | 60 | 61 | 62 | 62 |
| Color | | Lightly colored | Slightly colored | Slightly colored | Slightly colored | Slightly colored | Slightly colored |
| Stereo crystal rate (S) | % | 100 | 100 | 100 | 100 | 100 | 100 |

Note 1:
cannot be molded properly, only deformed molded products are collected, not measurable
C.Ex.: Comparative Example
Ex.: Example
pbw.: parts by weight Examples 10 to 16, Comparative Examples 5 to 7

Pellets containing a stabilizer and a release agent were prepared in the same manner as in Example 1. The obtained pellets were molded in the same manner as in Example 1 to obtain molded pieces. The molding cycle was fixed at 75 seconds. The measurement results of physical properties of the pellets and molded pieces are shown in Table 2. As obvious from Table 2, the compositions of the present invention have excellent wet heat stability, molecular weight retention and moldability.

TABLE 2

| | | Example 10 | Example 11 | Example 12 | Example 13 | Example 14 |
|---|---|---|---|---|---|---|
| Polylactic acid (A) | Type | A-2 | A-3 | A-3 | A-1 | A-3 |
| | pbw | 100 | 100 | 100 | 100 | 100 |
| Weight average molecular weights of raw material | | 180,000 | 156,000 | 156,000 | 160,000 | 156,000 |
| Carbodiimide compound (B) | Type | B-1 | B-1 | B-1 | B-1 | B-1 |
| | pbw | 1 | 1 | 1 | 1 | 1 |
| Phosphoric acid ester metal salt (C) | Type | C-1 | C-1 | C-1 | C-1 | C-1 |
| | pbw | 0.5 | 0.5 | 0.5 | 1 | 0.5 |
| Thermoplastic resin (D) | Type | — | — | — | — | — |
| | pbw | — | — | — | — | — |

TABLE 2-continued

|  |  |  |  |  |  |  |
|---|---|---|---|---|---|---|
| Stabilizer (E) | Type | E-1 | E-2 | E-3 | E-3 | E-3 |
|  | pbw | 0.01 | 0.01 | 0.01 | 0.01 | 0.01 |
| Crystallization accelerator (F) | Type | — | — | — | — | F-1 |
|  | pbw | — | — | — | — | 5 |
| Filler (G) | Type | — | — | — | — | — |
|  | pbw | — | — | — | — | — |
| Release agent (H) | Type | H-1 | H-1 | H-2 | H-2 | H-1 |
|  | pbw | 0.05 | 0.05 | 0.05 | 0.05 | 0.05 |
| carboxyl terminal capping agent (J) | Type | — | — | — | — | — |
|  | pbw | — | — | — | — | — |
| Weight average molecular weight retention of composition | % | 90 | 91 | 91 | 90 | 89 |
| Wet heat stability | % | 86 | 85 | 95 | 95 | 95 |
| Melt stability | % | 88 | 89 | 88 | 86 | 86 |
| Relative crystallinity |  | 95 | 94 | 95 | 98 | 99 |
| Molding cycle | sec | 75 | 75 | 75 | 75 | 75 |
| Appearance of molded piece | Visual check | ◎ | ◎ | ◎ | ◎ | ◎ |
| Tensile strength | MPa | 61 | 61 | 61 | 64 | 62 |
| Color |  | Slightly colored | Slightly colored | Slightly colored | Lightly colored | Lightly colored |
| Stereo crystal rate (S) | % | 98 | 100 | 100 | 100 | 100 |

|  |  | Ex. 15 | Ex. 16 | C.Ex. 5 | C.Ex. 6 | C.Ex. 7 |
|---|---|---|---|---|---|---|
| Polylactic acid (A) | Type | A-3 | A-3 | A-3 | A-3 | A-3 |
|  | pbw | 100 | 100 | 100 | 100 | 100 |
| Weight average molecular weights of raw material |  | 156,000 | 156,000 | 156,000 | 156,000 | 156,000 |
| Carbodiimide compound (B) | Type | B-1 | B-1 | — | B-1 | — |
|  | pbw | 1 | 1 | — | 1 | — |
| Phosphoric acid ester metal salt (C) | Type | C-1 | C-1 | — | — | C-1 |
|  | pbw | 0.5 | 0.5 | — | — | 0.5 |
| Thermoplastic resin (D) | Type | — | — | — | — | — |
|  | pbw | — | — | — | — | — |
| Stabilizer (E) | Type | E-3 | E-3 | E-3 | E-3 | E-3 |
|  | pbw | 0.01 | 0.01 | 0.01 | 0.01 | 0.01 |
| Crystallization accelerator (F) | Type | F-1 | — | F-1 | F-1 | F-1 |
|  | pbw | 5 | — | 5 | 5 | 5 |
| Filler (G) | Type | — | — | — | — | — |
|  | pbw | — | — | — | — | — |
| Release agent (H) | Type | H-2 | H-1 | H-1 | H-1 | H-1 |
|  | pbw | 0.05 | 0.05 | 0.05 | 0.05 | 0.05 |
| carboxyl terminal capping agent (J) | Type | — | J-1 | J-1 | J-1 | J-1 |
|  | pbw | — | 0.1 | 0.1 | 0.1 | 0.1 |
| Weight average molecular weight retention of composition | % | 90 | 90 | 95 | 98 | 72 |
| Wet heat stability | % | 95 | 95 | 71 | 80 | 65 |
| Melt stability | % | 86 | 86 | 84 | 85 | 85 |
| Relative crystallinity |  | 99 | 93 | 55 | 51 | 99 |
| Molding cycle | Sec | 75 | 75 | Note 1 | Note 1 | 75 |
| Appearance of molded piece | Visual check | ◎ | ◎ | X | X | Δ |
| Tensile strength | MPa | 64 | 63 | Note 1 | Note 1 | 54 |
| Color |  | lightly colored | lightly colored | Slightly colored | Slightly colored | Slightly colored |
| Stereo crystal rate (S) | % | 100 | 100 | 65 | 60 | 89 |

Note 1:
cannot be molded properly, only deformed molded products are collected, not measurable
pbw: parts by weight
Ex.: Example
C.Ex.: Comparative Example Examples 17 to 23

Pellets containing a thermoplastic resin (D) and a filler (G) were prepared in the same manner as in Example 1. The obtained pellets were molded in the same manner as in Example 1 to obtain molded pieces. The measurement results of the physical properties of the pellets and the molded pieces are shown in Table 3. As obvious from Table 3, the compositions of the present invention have excellent wet heat stability, molecular weight retention and moldability.

TABLE 3

|  |  | Ex. 17 | Ex. 18 | Ex. 19 | Ex. 20 | Ex. 21 | Ex. 22 | Ex. 23 |
|---|---|---|---|---|---|---|---|---|
| Polylactic acid (A) | Type | A-3 | A-3 | A-3 | A-3 | A-3 | A-3 | A-3 |
|  | pbw | 100 | 100 | 100 | 100 | 100 | 100 | 100 |
| Weight average molecular weights of raw material |  | 156,000 | 156,000 | 156,000 | 156,000 | 156,000 | 156,000 | 156,000 |
| Carbodiimide compound (B) | Type | B-3 | B-4 | B-3 | B-4 | B-3 | B-4 | B-1 |
|  | pbw | 2 | 2 | 2 | 2 | 2 | 2 | 2 |
| Phosphoric acid ester | Type | C-1 | C-1 | C-1 | C-1 | C-2 | C-2 | C-2 |
| metal salt (C) | pbw | 0.7 | 0.7 | 0.7 | 0.7 | 0.7 | 0.7 | 0.7 |
| Thermoplastic resin (D) | Type | D-1 | D-2 | D-3 | D-4 | D-5 | D-7 | D-7 |
|  | pbw | 15 | 15 | 15 | 15 | 15 | 15 | 15 |
| Stabilizer (E) | Type | E-3 | E-3 | E-3 | E-3 | E-3 | E-3 | E-3 |
|  | pbw | 0.01 | 0.01 | 0.01 | 0.01 | 0.01 | 0.01 | 0.01 |
| Crystallization | Type | — | — | — | — | — | — | — |
| accelerator (F) | pbw | — | — | — | — | — | — | — |
| Filler (G) | Type | G-1 | — | G-2 | — | G-3 | G-4 | G-1 |
|  | pbw | 15 | — | 15 | — | 15 | 15 | 15 |
| Release agent (H) | Type | H-1 | H-2 | H-1 | H-2 | H-1 | H-2 | H-1 |
|  | pbw | 0.07 | 0.07 | 0.07 | 0.07 | 0.07 | 0.07 | 0.07 |
| Weight average molecular weight retention of composition | % | 92 | 92 | 91 | 92 | 91 | 90 | 92 |
| Molding cycle | sec | 75 | 75 | 75 | 75 | 75 | 75 | 75 |
| Appearance of molded piece | Visual check | ◎ | ◎ | ◎ | ◎ | ◎ | ◎ | ◎ |
| Tensile strength | MPa | 75 | 61 | 96 | 64 | 75 | 65 | 77 |
| Color |  | lightly colored | Slightly colored | lightly colored | lightly colored | lightly colored | lightly colored | lightly colored |
| Stereo crystal rate (S) | % | 100 | 100 | 100 | 100 | 100 | 100 | 100 |

Ex.: Example
pbw: parts by weight

Example 24

30 mm of the pellet obtained in Example 4 was let pass through a double-screw extruder (cylinder temperature of 190° C.) and supplied into the T die of a molding machine. The pellet was melt extruded into a new endless film having a thickness of 0.1 mm and a width of 500 mm while it was sandwiched between a mirror surface cooling roll and a mirror surface roll or one side was held. The sheet was well molded. The sheet had strengths in the MD and TD directions of 147 and 127 MPa, respectively, and a transmittance of 91%, and a 100 mm² film cut out from the sheet at random had 8 fish eyes when checked with eyes.

Example 25

The pellet obtained in Example 1 was spun into yarn consisting of 36 filaments at a spinning pack temperature of 220° C. and a spinning rate of 3,000 m/min by applying a fiber lubricant comprising a fatty acid ester as the main component. The unstretched yarn was stretched to 1.45 times at 90° C., heat set at 130° C. and wound up. Spinning and stretching could be carried out well.

As for the physical properties of the obtained multifilament, a load elongation curve based on JIS L1013 was obtained at 25° C., an initial sample length of 200 mm and a stretching rate of 200 mm/min, and breaking strength was divided by initial fineness to obtain strength and elongation. The boiling water shrinkage factor was obtained from (L0−L1)×100/L0 by measuring the initial length L0 when an initial load of 0.09 cN/dtex was applied to 200 mm of the sample, treating it in boiling water for 15 minutes under no load, drying it with air and measuring the treated length L1 under an initial load of 0.09 cN/dtex. As a result, the obtained multifilament was a satisfactory fiber having a strength of 4 cN/dtex, an elongation of 35% and a boiling water shrinkage factor of 10%.

Examples 26 to 34, Comparative Examples 8 to 10

A carbodiimide compound (B) and a phosphoric acid ester metal salt (C) were added to the stereocomplex polylactic acid to produce pellets and molded pieces under the following conditions.

(Pellet)

The types and amounts based on 100 parts by weight of polylactic acid (A) of a carbodiimide compound (B), a phosphoric acid ester metal salt (C) and other additives shown in Table 4 were uniformly mixed together by means of a tumbler, and the resulting mixture was pelletized by a double-screw extruder having a 30 mm-diameter vent (KTX-30 of Kobe Steel, Ltd.) at a cylinder temperature of 230° C. while deaeration was carried out at a vacuum degree of 10 mmHg. The melt stability, wet heat stability, molecular weight retention and stereo crystal rate (S) obtained from the melting heat (ΔHmh) of the homo-phase crystal and the melting heat (ΔHmcs) of the complex-phase crystal of polylactic acid at a temperature lower than 190° C. measured by DSC of the obtained pellet were obtained.

(Molded Piece)

The obtained pellet was dried at 110° C. for 5 hours and molded at a cylinder temperature of 250° C. and a mold temperature of 110° C. by using an injection molding machine (SG150U of Sumitomo Heavy Industries, Ltd.) to obtain a molded piece having a thickness of 3 mm for ASTM measurement. At this point, the shortest time during which a molded piece was obtained without deformation was taken as molding cycle. The tensile strength, appearance and other physical properties of the obtained molded piece were obtained.

The measurement results of the physical properties of the pellets and the molded pieces are shown in Table 4. As shown in Table 4, the composition of the present invention is excellent in molecular weight retention, wet heat stability, melt stability, stereo crystal rate and moldability.

TABLE 4

|  |  | C.Ex. 8 | C.Ex. 9 | C.Ex. 10 | Ex. 26 | Ex. 27 | Ex. 28 |
| --- | --- | --- | --- | --- | --- | --- | --- |
| Polylactic acid (A) | Type | A-1 | A-1 | A-1 | A-1 | A-2 | A-3 |
|  | pbw | 50 | 50 | 50 | 50 | 50 | 50 |
|  | Type | A-4 | A-4 | A-4 | A-4 | A-4 | A-4 |
|  | pbw | 50 | 50 | 50 | 50 | 50 | 50 |
| Weight average molecular weights of raw material |  | 156,000 | 156,000 | 156,000 | 156,000 | 167,000 | 156,000 |
| Carbodiimide compound (B) | Type | — | B-1 | — | B-1 | B-3 | B-4 |
|  | pbw | — | 1 | — | 0.5 | 0.5 | 2 |
| Phosphoric acid ester metal salt (C) | Type | — | — | C-1 | C-1 | C-2 | C-3 |
|  | pbw | — | — | 0.5 | 0.5 | 0.5 | 0.5 |
| Stabilizer (E) | Type | — | — | — | — | — | — |
|  | pbw | — | — | — | — | — | — |
| Crystallization accelerator (F) | Type | — | — | — | — | — | — |
|  | pbw | — | — | — | — | — | — |
| Filler (G) | Type | — | — | — | — | — | — |
|  | pbw | — | — | — | — | — | — |
| Release agent (H) | Type | — | — | — | — | — | — |
|  | pbw | — | — | — | — | — | — |
| Weight average molecular weight retention of composition | % | 90 | 93 | 70 | 85 | 85 | 91 |
| Wet heat stability | % | 70 | 92 | 61 | 86 | 84 | 93 |
| Melt stability | % | 91 | 88 | 77 | 89 | 89 | 88 |
| Stereo crystal rate | % | 40 | 35 | 89 | 95 | 94 | 94 |
| Molding cycle | sec | Note 1 | Note 1 | 85 | 80 | 81 | 81 |
| Appearance of molded piece | Visual check | X | X | Δ | ◎ | ◎ | ◎ |
| Tensile strength | MPa | Note 1 | Note 1 | 58 | 61 | 61 | 62 |
| Color |  | Slightly colored | Slightly colored | Slightly colored | Slightly colored | Slightly colored | Slightly colored |
| Stereo crystal rate (S) | % | 60 | 68 | 97 | 100 | 100 | 100 |

|  |  | Ex. 29 | Ex. 30 | Ex. 31 | Ex. 32 | Ex. 33 | Ex. 34 |
| --- | --- | --- | --- | --- | --- | --- | --- |
| Polylactic acid (A) | Type | A-3 | A-3 | A-3 | A-3 | A-3 | A-3 |
|  | pbw | 50 | 50 | 50 | 50 | 50 | 50 |
|  | Type | A-4 | A-4 | A-4 | A-4 | A-4 | A-4 |
|  | pbw | 50 | 50 | 50 | 50 | 50 | 50 |
| Weight average molecular weights of raw material |  | 156,000 | 156,000 | 156,000 | 156,000 | 156,000 | 156,000 |
| Carbodiimide compound (B) | Type | B-1 | B-2 | B-3 | B-4 | B-1 | B-1 |
|  | pbw | 3 | 1 | 1 | 1 | 1 | 1 |
| Phosphoric acid ester metal salt (C) | Type | C-1 | C-2 | C-3 | C-1 | C-1 | C-1 |
|  | pbw | 1 | 0.5 | 0.5 | 0.5 | 0.5 | 0.5 |
| Stabilizer (E) | Type | — | — | E-1 | E-2 | E-1/E-3 | E-1/E-3 |
|  | pbw | — | — | 0.01 | 0.01 | 0.01/0.01 | 0.01/0.01 |
| Crystallization accelerator (F) | Type | — | — | — | — | — | — |
|  | pbw | — | — | — | — | — | — |
| Filler (G) | Type | — | — | — | — | — | G-1 |
|  | pbw | — | — | — | — | — | 10 |
| Release agent (H) | Type | — | — | — | — | — | — |
|  | pbw | — | — | — | — | — | — |
| Weight average molecular weight retention of composition | % | 93 | 90 | 90 | 90 | 90 | 90 |
| Wet heat stability | % | 95 | 91 | 90 | 92 | 93 | 90 |
| Melt stability | % | 83 | 89 | 89 | 89 | 89 | 86 |
| Stereo crystal rate | % | 95 | 95 | 93 | 94 | 94 | 99 |
| Molding cycle | Sec | 85 | 80 | 85 | 80 | 70 | 70 |
| Appearance of molded piece | Visual check | ◎ | ◎ | ◎ | ◎ | ◎ | ◎ |
| Tensile strength | MPa | 63 | 61 | 60 | 61 | 62 | 60 |
| Color |  | Lightly colored | Slightly colored | Slightly colored | Slightly colored | Slightly colored | Slightly colored |
| Stereo crystal rate (S) | % | 100 | 100 | 100 | 100 | 100 | 100 |

Note 1:
cannot be molded properly, only deformed molded products are collected, not measurable
C.Ex.: Comparative Example
Ex.: Example
pbw: parts by weight

Example 35

30 mm of the pellet obtained in Example 28 was let pass through a double-screw extruder (cylinder temperature of 220° C.) and supplied into the T die of a molding machine. The pellet was melt extruded into a new endless film having a thickness of 0.1 mm and a width of 500 mm while it was sandwiched between a mirror surface cooling roll and a mirror surface roll or one side was held. The sheet was well molded. The sheet had strengths in the MD and TD directions of 147 and 127 MPa, respectively, and a transmittance of 91%, and a 100 mm$^2$ film cut out from the sheet at random had 10 fish eyes when checked with eyes.

The pellet obtained in Example 28 was spun into yarn consisting of 36 filaments at a spinning pack temperature of 220° C. and a spinning rate of 3,000 m/min by applying a fiber lubricant comprising a fatty acid ester as the main component. The unstretched yarn was stretched to 1.45 times at 90° C., heat set at 130° C. and wound up. Spinning ad stretching could be carried out well.

As for the physical properties of the obtained multifilament, a load elongation curve based on JIS L1013 was obtained at 25° C., an initial sample length of 200 mm and a stretching rate of 200 mm/min, and breaking strength was divided by initial fineness to obtain strength and elongation. The boiling water shrinkage factor was obtained from (L0−L1)×100/L0 by measuring the initial length L0 when an initial load of 0.09 cN/dtex was applied to 200 mm of the sample, treating it in boiling water for 15 minutes under no load, drying it with air and measuring the treated length L1 under an initial load of 0.09 cN/dtex. As a result, the obtained multifilament was a satisfactory fiber having a strength of 4.1 cN/dtex, an elongation of 31% and a boiling water shrinkage factor of 8%.

Examples 36 to 42

The effects of the thermoplastic resin (D) and the filler (G) were investigated in the same manner as in Example 26 and the results are shown in Table 5. The compositions of the present invention had excellent in wet heat stability, molecular weight retention and moldability.

TABLE 5

|  |  | Ex. 36 | Ex. 37 | Ex. 38 | Ex. 39 | Ex. 40 | Ex. 41 | Ex. 42 |
|---|---|---|---|---|---|---|---|---|
| Polylactic acid (A) | Type | A-3 | A-3 | A-3 | A-3 | A-3 | A-3 | A-3 |
|  | pbw | 50 | 50 | 50 | 50 | 50 | 50 | 50 |
|  | Type | A-4 | A-4 | A-4 | A-4 | A-4 | A-4 | A-4 |
|  | pbw | 50 | 50 | 50 | 50 | 50 | 50 | 50 |
| Weight average molecular weights of raw material |  | 156,000 | 156,000 | 156,000 | 156,000 | 156,000 | 156,000 | 156,000 |
| Carbodiimide compound (B) | Type | B-3 | B-4 | B-3 | B-4 | B-3 | B-4 | B-1 |
|  | pbw | 2 | 2 | 2 | 2 | 2 | 2 | 2 |
| Phosphoric acid ester metal salt (C) | Type | C-1 | C-1 | C-1 | C-1 | C-2 | C-2 | C-2 |
|  | pbw | 0.7 | 0.7 | 0.7 | 0.7 | 0.7 | 0.7 | 0.7 |
| Thermoplastic resin (D) | Type | D-1 | D-2 | D-3 | D-4 | D-5 | D-7 | D-7 |
|  | pbw | 15 | 15 | 15 | 15 | 15 | 15 | 15 |
| Stabilizer (E) | Type | E-3 | E-3 | E-3 | E-3 | E-3 | E-3 | E-3 |
|  | pbw | 0.01 | 0.01 | 0.01 | 0.01 | 0.01 | 0.01 | 0.01 |
| Crystallization accelerator (F) | Type | — | — | — | — | — | — | — |
|  | pbw | — | — | — | — | — | — | — |
| Filler (G) | Type | G-1 | — | G-2 | — | G-3 | G-4 | G-1 |
|  | pbw | 15 | — | 15 | — | 15 | 15 | 15 |
| Release agent (H) | Type | H-1 | H-2 | H-1 | H-2 | H-1 | H-2 | H-1 |
|  | pbw | 0.07 | 0.07 | 0.07 | 0.07 | 0.07 | 0.07 | 0.07 |
| Weight average molecular weight retention of composition | % | 92 | 91 | 92 | 92 | 91 | 91 | 91 |
| Molding cycle | Sec | 85 | 90 | 80 | 80 | 80 | 85 | 85 |
| Appearance of molded piece | Visual check | ◎ | ◎ | ◎ | ◎ | ◎ | ◎ | ◎ |
| Tensile strength | MPa | 73 | 61 | 88 | 64 | 66 | 64 | 68 |
| Color |  | Lightly colored | Slightly colored | Lightly colored | Lightly colored | Lightly colored | Lightly colored | Lightly colored |
| Stereo crystal rate (S) | % | 100 | 100 | 100 | 100 | 100 | 100 | 100 |

Ex.: Example
pbw: parts by weight

Example 43

(Production of poly(L-lactic acid))

100 parts by weight of L-lactide (manufactured by Musashino Chemical Laboratory Ltd., polymerization grade) and 0.15 part by weight of stearyl alcohol were charged into a polymerization reactor having a cooling distillation tube from a raw material feed port in a nitrogen gas stream. Subsequently, the inside of the reactor was substituted by nitrogen 5 times, and L-lactide was molten at 190° C. When L-lactide was molten completely, 0.05 part by weight of tin 2-ethylhexanoate was added from the raw material feed port together with 500 μl of toluene to carry out polymerization at 190° C. for 1 hour. After the end of polymerization, 0.055 part by weight of ethyl diethylphosphonoacetate was added from a catalyst injection port and kneaded with the obtained polymer for 15 minutes. Finally, excess L-lactide was volatilized, and strand-like poly(L-lactic acid) was discharged from the discharge port of the reactor and cut into a pellet while it was cooled. Mw of the obtained poly(L-lactic acid) was 14.7×10$^4$.

(Production of poly(D-lactic acid))

Then, poly(D-lactic acid) was prepared by the same operation as described above. That is, 100 parts by weight of D-lactide (manufactured by Musashino Chemical Laboratory Ltd., polymerization grade) and 0.15 part by weight of stearyl alcohol were charged, the inside of the reactor was substituted by nitrogen 5 times, and D-lactide was molten at 190° C.

When D-lactide was molten completely, 0.05 part by weight of tin 2-ethylhexanoate was added from the raw material feed port together with 500 μl of toluene to carry out polymerization at 190° C. for 1 hour. After the end of polymerization, 0.055 part by weight of ethyl diethylphosphonoacetate was added from the catalyst injection port and kneaded with the obtained polymer for 15 minutes. Finally, excess D-lactide was volatilized, and strand-like poly(D-lactic acid) was discharged from the discharge port of the reactor and cut into a pellet while it was cooled. Mw of the obtained poly(D-lactic acid) was $13.2 \times 10^4$.

(Formation of Stereocomplex)

50 parts by weight of the pellet of the above poly(L-lactic acid) (A), 50 parts by weight of the pellet of the above poly(D-lactic acid) (A), 1 part by weight of a carbodiimide (B-1), 0.5 part by weight of 2,2-methylenebis(4,6-di-tert-butylphenyl) sodium phosphate (C) having an average particle diameter of 2 μm and 0.5 part by weight of calcium metasilicate (F-2) having an average particle diameter of 2 μm were mixed and kneaded together well by means of the Labo Plastmill 50C150 kneader of Toyo Seiki Co., Ltd. in a nitrogen gas stream at 260° C. for 3 minutes. The weight average molecular weight (Mw) and stereo crystal rate (S) of the obtained polylactic acid composition are shown in Table 6.

Example 44

A polylactic acid composition was prepared in the same manner as in Example 1 except that 0.5 part by weight of calcium metasilicate (F-2) was changed to 0.5 part by weight of sodium perborate having an average particle diameter of 2 μm (F-3). Mw and stereo crystal rate (S) of the obtained polylactic acid composition are shown in Table 6.

TABLE 6

|  | S (%) | Mw |
| --- | --- | --- |
| Example 43 | 100 | $13.6 \times 10^4$ |
| Example 44 | 100 | $12.4 \times 10^4$ |

Effect of the Invention

The composition of the present invention is excellent in crystallinity, wet heat stability and melt stability. The composition of the present invention is also excellent in moldability and mechanical strength. The molded article of the present invention is excellent in appearance and color. Further, stereocomplex polylactic acid having excellent stereo crystal rate and wet heat stability while maintaining its molecular weight can be produced by the method of the present invention.

The invention claimed is:

1. A composition comprising a polylactic acid (component A), a carbodiimide compound (component B) and a phosphoric acid ester metal salt (component C), wherein the component A is a mixture of a poly(L-lactic acid) and a poly(D-lactic acid), and wherein the composition has a stereo crystal rate (S) of 100%

(the stereo crystal rate (S) is expressed by the following equation:

$S(\%) = [\Delta Hmsc/(\Delta Hmh + \Delta Hmsc)] \times 100$

ΔHmh is the crystal melting heat of a homo-phase crystal melting peak at a temperature lower than 190° C. observed in the DSC measurement and ΔHmsc is the crystal melting heat of a complex-phase crystal melting peak at a temperature of 190° C. or higher observed in the DSC. measurement).

2. The composition according to claim 1 which comprises 0.01 to 10 parts by weight of the component B and 0.01 to 5 parts by weight of the component C based on 100 parts by weight of the component A.

3. The composition according to claim 1, wherein the poly(D-lactic acid) or the poly(L-lactic acid) is obtained respectively by melt ring-opening polymerizing D-lactide or L-lactide having an optical purity of 90 to 100% in the presence of an alcohol-based initiator and a metal catalyst and adding a catalyst deactivator in an amount of 0.3 to 20 equivalents based on 1 equivalent of the metal element of the metal catalyst.

4. The composition according to claim 1, wherein the component B is a carbodiimide compound which contains 0.1 to 5 wt % of an isocyanate group and has a carbodiimide equivalent of 200 to 500.

5. The composition according to claim 1, wherein the component C is a compound represented by the following formula (2) or (3):

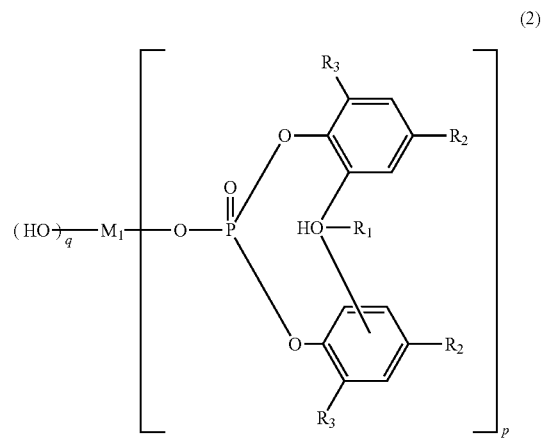

(in the formula (2), $R_1$ is a hydrogen atom or alkyl group having 1 to 4 carbon atoms, $R_2$ and $R_3$ are each independently a hydrogen atom or alkyl group having 1 to 12 carbon atoms, $M_1$ is an alkali metal atom, alkali earth metal atom, zinc atom or aluminum atom, p is 1 or 2, and q is 0 when $M_1$ is an alkali metal atom, alkali earth metal atom or zinc atom and 1 or 2 when $M_1$ is an aluminum atom)

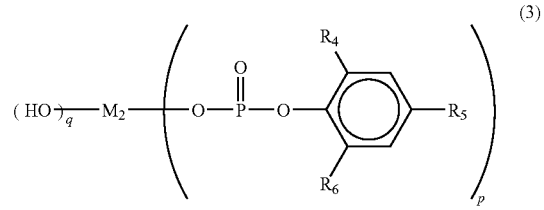

(in the formula (3), $R_4$, $R_5$ and $R_6$ are each independently a hydrogen atom or alkyl group having 1 to 12 carbon atoms, $M_2$ is an alkali metal atom, alkali earth metal atom, zinc atom or aluminum atom, p is 1 or 2, and q is 0 when $M_2$ is an alkali metal atom, alkali earth metal atom or zinc atom and 1 or 2 when $M_2$ is an aluminum atom).

6. The composition according to claim 1 which further comprises at least one selected from the group consisting of a thermoplastic resin (component D) except for the component A, a stabilizer (component E), a crystallization accelerator (component F), a filler (component G), a release agent (component H), an antistatic agent (component I), a carboxyl group reactive terminal capping agent (component J), a plasticizer (component K) and an impact resistance stabilizer (component L).

7. The composition according to claim 6, wherein the stabilizer (component E) is at least one selected from the group consisting of a hindered phenol-based compound, hindered amine-based compound, phosphite-based compound, thioether-based compound and optical stabilizer.

8. The composition according to claim 6, wherein the crystallization accelerator (component F) is a triclinic inorganic nucleating agent.

9. The composition according to claim 1 which has a wet heat stability of not less than 80%.

10. The composition according to claim 1 which has a melt stability of not less than 80%.

11. The composition according to claim 1 which has a relative crystallinity (RC) of not less than 80% (relative crystallinity (RC) is expressed by the following equation:

$$RC(\%) = \{(\Delta Hm1 - \Delta Hcc1)/\Delta Hm1\} \times 100$$

($\Delta Hm1$ is crystal melting heat and $\Delta Hcc1$ is crystallization enthalpy).

12. A molded article of the composition of claim 1.

13. The molded article according to claim 12 which is a film, sheet or fiber.

* * * * *